United States Patent
Burk et al.

(10) Patent No.: US 10,075,343 B2
(45) Date of Patent: Sep. 11, 2018

(54) POLICY STORE

(71) Applicant: VMware, Inc., Palo Alto, CA (US)

(72) Inventors: Gregory T. Burk, Colorado Springs, CO (US); Lachlan T. Coote, Mountain View, CA (US)

(73) Assignee: VMware, Inc., Palo Alto, CA (US)

( * ) Notice: Subject to any disclaimer, the term of this patent is extended or adjusted under 35 U.S.C. 154(b) by 171 days.

(21) Appl. No.: 14/828,443

(22) Filed: Aug. 17, 2015

(65) Prior Publication Data
US 2017/0033996 A1 Feb. 2, 2017

Related U.S. Application Data

(60) Provisional application No. 62/199,972, filed on Jul. 31, 2015.

(51) Int. Cl.
*H04L 12/24* (2006.01)
*G06F 15/16* (2006.01)
*H04L 12/813* (2013.01)

(52) U.S. Cl.
CPC .......... *H04L 41/0893* (2013.01); *H04L 41/08* (2013.01); *G06F 15/161* (2013.01); *H04L 47/20* (2013.01)

(58) Field of Classification Search
CPC ..... H04L 41/00; H04L 41/08; H04L 41/0803; H04L 41/0893; G06F 15/00; G06F 15/16; G06F 15/161; G06F 15/177
See application file for complete search history.

(56) References Cited

U.S. PATENT DOCUMENTS

| | | | | |
|---|---|---|---|---|
| 5,968,176 | A * | 10/1999 | Nessett | H04L 63/02 726/11 |
| 6,466,932 | B1 | 10/2002 | Dennis et al. | |
| 6,587,876 | B1 * | 7/2003 | Mahon | H04L 41/0893 709/203 |
| 6,826,698 | B1 * | 11/2004 | Minkin | H04L 63/0263 709/223 |
| 7,444,395 | B2 | 10/2008 | Sanghvi et al. | |
| 7,512,965 | B1 * | 3/2009 | Amdur | H04L 63/20 726/1 |

(Continued)

OTHER PUBLICATIONS

United States and Trademark Office, "Non-Final Office Action," issued in connection with U.S. Appl. No. 14/828,447, dated Sep. 14, 2017, 29 pages.

(Continued)

*Primary Examiner* — Arvin Eskandarnia
*Assistant Examiner* — Boris Grijalva Lobos
(74) *Attorney, Agent, or Firm* — Hanley, Flight & Zimmerman, LLC

(57) ABSTRACT

Some embodiments provide a method for managing policies for a set of computing resources. The method imports several sets of resource management policy rules from several heterogeneous sources. The method stores each set of imported policy rules as a primitive policy. The primitive policies are (i) applicable to resources in the set of computing resources and (ii) combinable into composite policies that are applicable to resources in the set of computing resources. Composite policies are combinable into additional composite policies with primitive policies and other composite policies.

18 Claims, 29 Drawing Sheets

(56) References Cited

U.S. PATENT DOCUMENTS

| | | | |
|---|---|---|---|
| 7,747,736 B2* | 6/2010 | Childress | G06Q 10/06 705/7.11 |
| 7,756,960 B2* | 7/2010 | Gonguet | H04L 41/044 709/220 |
| 7,809,667 B1* | 10/2010 | Yehuda | G06F 21/52 706/47 |
| 7,890,626 B1 | 2/2011 | Gadir | |
| 8,661,548 B2* | 2/2014 | Shannon | G06F 11/0709 726/26 |
| 8,683,545 B2* | 3/2014 | Nadalin | H04L 63/102 726/1 |
| 8,838,793 B1* | 9/2014 | Thrasher | H04L 63/10 709/223 |
| 9,106,661 B1 | 8/2015 | Stamos | |
| 9,270,701 B1* | 2/2016 | Lamb | H04L 63/20 |
| 9,311,386 B1 | 4/2016 | Song et al. | |
| 9,471,798 B2* | 10/2016 | Vepa | H04L 41/0893 |
| 9,576,257 B2* | 2/2017 | Short | G06Q 10/06 |
| 9,621,587 B2* | 4/2017 | Roberts | H04L 63/20 |
| 9,680,875 B2* | 6/2017 | Knjazihhin | H04L 63/20 |
| 2002/0052980 A1 | 5/2002 | Sanghvi et al. | |
| 2002/0099952 A1* | 7/2002 | Lambert | G06F 21/51 726/27 |
| 2002/0147828 A1* | 10/2002 | Chen | H04W 28/24 709/231 |
| 2003/0037322 A1 | 2/2003 | Kodosky et al. | |
| 2003/0115204 A1 | 6/2003 | Greenblatt et al. | |
| 2007/0050323 A1 | 3/2007 | Dettinger et al. | |
| 2007/0061125 A1* | 3/2007 | Bhatt | G06F 21/577 703/20 |
| 2007/0156659 A1* | 7/2007 | Lim | G06F 21/6227 |
| 2007/0174031 A1* | 7/2007 | Levenshteyn | G06F 21/6218 703/13 |
| 2007/0282986 A1* | 12/2007 | Childress | G06Q 10/06 709/223 |
| 2007/0288467 A1* | 12/2007 | Strassner | H04L 41/0226 |
| 2008/0086717 A1 | 4/2008 | Brunn et al. | |
| 2008/0104665 A1* | 5/2008 | Naldurg | G06F 21/577 726/2 |
| 2008/0184201 A1* | 7/2008 | Burns | H04L 41/0893 717/121 |
| 2008/0201493 A1 | 8/2008 | Richardson et al. | |
| 2009/0049230 A1* | 2/2009 | Pandya | C11D 9/26 711/101 |
| 2010/0107215 A1* | 4/2010 | Bechtel | H04L 63/105 726/1 |
| 2010/0153950 A1 | 6/2010 | Govindankutty et al. | |
| 2010/0333167 A1 | 12/2010 | Luo et al. | |
| 2012/0023554 A1* | 1/2012 | Murgia | H04L 63/102 726/4 |
| 2012/0102543 A1* | 4/2012 | Kohli | H04L 63/20 726/1 |
| 2012/0246701 A1* | 9/2012 | Swamy | G06F 17/00 726/4 |
| 2012/0276867 A1* | 11/2012 | McNamee | H04L 12/1407 455/406 |
| 2013/0031596 A1* | 1/2013 | Becker | G06F 21/556 726/1 |
| 2013/0190902 A1 | 7/2013 | Itou | |
| 2014/0108649 A1 | 4/2014 | Barton et al. | |
| 2014/0181889 A1 | 6/2014 | Black | |
| 2014/0337914 A1 | 11/2014 | Canning et al. | |
| 2015/0089575 A1* | 3/2015 | Vepa | H04L 41/0893 726/1 |
| 2016/0036636 A1* | 2/2016 | Erickson | H04L 41/145 370/248 |
| 2016/0212168 A1* | 7/2016 | Dotan | H04L 63/20 |
| 2016/0212170 A1* | 7/2016 | Martherus | H04L 63/10 |
| 2017/0142010 A1* | 5/2017 | Mathew | H04L 45/745 |

OTHER PUBLICATIONS

United States Patent and Trademark Office, "Non-Final Office Action," issued in connection with U.S. Appl. No. 14/828,455, dated Sep. 25, 2017, 20 pages.

United States and Trademark Office, "Non-Final Office Action," issued in connection with U.S. Appl. No. 14/828,460, dated Nov. 13, 2017, 14 pages.

United States Patent and Trademark Office, "Non-Final Office Action," issued in connection with U.S. Appl. No. 14/828,441, dated Jan. 12, 2018, 32 pages.

United States Patent and Trademark Office, "Non-Final Office Action," issued in connection with U.S. Appl. No. 14/828,446, dated Jan. 29, 2018, 15 pages.

United States Patent and Trademark Office, "Final Office Action," issued in connection with U.S. Appl. No. 14/828,460, dated Apr. 17, 2018, 9 pages.

* cited by examiner

POLICY STORE

BACKGROUND

Policies can be a powerful tool for managing complex environments with vast numbers of resources, such as a software-defined datacenter (SDDC). If a business' requirements, intentions, rules, etc. can be captured in a set of policies, these policies can be used to drive automated processes that enact and enforce the business' will. This improves accuracy and efficiency by removing manual human intervention and guarantees corporate governance is maintained. Because automation is central to the idea of the SDDC, policy-based management is critical to the realization of the SDDC.

However, across the various platforms used to manage the SDDC, policy may mean different things, and policies are implemented in very different ways. For instance, virtual machine (VM) placement may be performed in part based on one type of policy, networking configurations are constrained based on a different type of policy, etc. FIG. 1 illustrates an example of the policy sources and types of policies that might govern a set of computing resources. A storage manager 105 defines placement, configuration, and security policies for storage, a network manager 110 defines its own placement, configuration and security policies relating to the network, and a compute manager 115 also has its placement, configuration, and security policies relating to the data compute nodes (e.g., VMs, containers, physical machines) in the datacenter. In addition, an application manager 120 defines its placement, configuration, provisioning, and role-based access control (RBAC) policies, while an infrastructure manager 125 defines configuration and placement policies. Industry standards 130 also regulate the datacenter, defining various configuration, remediation, security, and best practice policies relating to a particular industry. Though six specific policy sources are shown in this figure, it should be understood that in many cases, different datacenters may include many other policy sources and/or policy types than those shown in this figure.

These divergent policies may pose significant challenges to the datacenter managers. In addition to confusion, higher-level business requirements may be difficult and complex to implement as policies. Multiple configurations, across multiple components, administered by multiple user roles must be coordinated. As an example, if a company requires that all of its "Mission Critical" applications exhibit specific availability, quality-of-service, and security requirements, this could potentially require configurations across numerous components that manage different aspects of the SDDC. Ideally, a datacenter administrator/owner should be able to manage the entire SDDC without such confusion and complexity, while still having the freedom to choose from various different policy options to accomplish their goals.

BRIEF SUMMARY

Some embodiments provide a policy unification framework for managing a set of computing resources, such as those in a datacenter (e.g., a software-defined datacenter) or a set of datacenters (e.g., a single datacenter, multiple datacenters, a hybrid of an enterprise datacenter and resources in cloud datacenters, etc.). The policy unification framework of some embodiments imports policies and resource descriptions from various sources, binds (i.e., applies) the policies to the resources according to binding rules and categories to which the resources belong, and provides the policy bindings to a set of policy engines (which may overlap with the sources of the policies and/or resource descriptions).

In some embodiments, the policy unification framework includes a policy store for automatically ingesting and storing policies from heterogeneous sources (e.g., network managers, storage managers, compute server managers, industry standards, etc.). These imported policies may be written in a variety of different languages (usually standards based or proprietary domain-specific languages) with different encodings (e.g., XML, JSON, plaintext, etc.), but upon import are stored in a normalization wrapper such that all policies have the same representation within the unified framework. The normalization wrapper of some embodiments provides the policy with a name and group (or namespace, which allows multiple different policies to have the same name so long as they do not also share a common namespace), and stores the content of the policy (e.g., the policy as written in the datalog, XML schema, JSON schema, etc. used by the policy provider) as another field of the wrapped policy.

The imported policies, in some embodiments, are stored as primitive (also called atomic) policies. The primitive policies represent a single policy, with the policy content defined within the policy wrapper. From these primitive policies, users of the policy unification framework can define composite policies, that refer to the primitive policies. A composite policy, in some embodiments, may involve a reference to a single primitive policy (e.g., in order to provide parameters for the primitive policy) or to multiple primitive policies. In addition, composite policies may refer to other composite policies.

In addition to the policy store, the policy unification framework of some embodiments also includes a resource store for ingesting and storing descriptions of the computing resources being managed from a set of heterogeneous sources, which may overlap with the sources of policies. These resources may include any entity that either constitutes a datacenter or operates (as hardware or software) either within the managed datacenter or outside of a managed datacenter but in concert with the managed datacenter (e.g., a cloud resource). Examples of such resources may include VMs, containers, servers, server racks, power circuits, datacenters and/or subsections of datacenters, users, user groups, applications, operating systems, services, etc., though this listing is not meant in any way to be limiting. From each source, the resource store reads in the descriptions of the computing resources managed by the source, which includes categories to which the resources belong. For instance, for a particular VM, the categories could include in which datacenter and/or rack and/or server it is located, which operating system it is running, whether it is an app server/web server/database server, etc.

Furthermore, the resource store of some embodiments may use a resource categorization service that derives additional categories for the resources. For example, the categorization service might detect when certain individual categories from various different sources are effectively the same, and create an amalgamated category for any resources that fall into any of the individual categories. The categorization service might also derive categories for resources that are categorized in a first category by a first source and a second category by a second source.

The policies (both primitive imported policies and user-defined composite policies) are then applied to the resources based on a set of binding rules that are stored with the policies. These binding rules may be defined by the user of the policy framework (e.g., a datacenter administrator) or may be built-in to the framework. In some embodiments, each binding rule specifies, for a policy or set of policies, one or more categories of resources to which the policies will be bound. For instance, a policy might be bound to all VMs in a particular datacenter, all servers that host a particular type of VM, etc. The binding rules may specify bindings of primitive policies or composite policies.

A compiler of the policy unification framework of some embodiments uses the binding rules to generate, for each resource for which information is stored by the system, a set of effective policies to apply to the resource. This compilation process flattens the composite policies that are applied to the resource, such that the effective policies specify all of the primitive policies to apply to the resource. These effective policies can then be consumed by various policy engines (which may be the same as the sources that provided some of the policies and/or resource descriptions in the first place). In addition, some embodiments allow for the inclusion of specific exceptions to policy binding rules (i.e., to not apply policy X to resource A). In some cases, adequate explanations may be required as documentation for those exceptions (e.g., for audit-related purposes).

In some embodiments, as mentioned, the policies are wrapped in a normalization wrapper in order for policies from a variety of heterogeneous sources to be treated in the same manner by the policy framework, and easily composed into composite policies and applied to resources. In addition to treating the policy definition (e.g., the policy as written in its standards based or domain-specific language, etc.) as a blob of content, the wrapper allows for easy composition and use of parameters to customize policies. In some embodiments, a primitive policy may include unspecified parameters, while composite policies that refer to that primitive policy specify the values of the parameters for a particular instance of the primitive policy. As an example, a policy specifying limits on VMs for a group might leave open the min/max memory, processor usage, disk space, etc. allowed for a VM. Different groups can then define composite policies that refer to the primitive policy, specifying different values for these parameters. In addition, the composition language of some embodiments allows the parameters to be defined by references to values found elsewhere (e.g., passed down from a higher-level composite policy, defined by a resource to which the policy is applied, etc.) or be a function of one or more values (e.g., a Max or Min function of multiple values that may be provided to the policy). Furthermore, the composition language allows conditional policy references in some embodiments. For instance, a composite policy might refer to a first primitive policy if a condition is met and a second primitive policy if the condition is not met. Similarly, the composite policy might refer to the same primitive policy, but pass different parameters depending on whether or not the condition is met.

The policy unification framework of some embodiments provides a user interface that allows an administrator of a system (e.g., an enterprise network) to view the policies, binding rules, and resources of the system. In some embodiments, the administrator can use the UI to create and edit composite policies, binding rules, and resource category derivation rules. When creating and editing the composite policies, the user may define how the policies are composed according to the policy composition features allowed by the composition language (e.g., define conditions for referencing policies, provide the parameters for the policy references, etc.).

Some embodiments also provide a policy validation engine within the policy unification framework. The application of heterogeneous policies from several frameworks may create conflicts, and the policy validation engine provides rules for resolving such issues within the framework (e.g., deciding which policy supersedes the other, notifying the administrator of the issue, etc.).

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a policy unification framework for managing a set of computing resources, such as those in a datacenter (e.g., a software-defined datacenter) or a set of datacenters. The policy unification framework of some embodiments imports policies and resource descriptions from various sources, binds (i.e., applies) the policies to the resources according to binding rules and categories to which the resources belong, and provides the policy bindings to a set of policy engines (which may overlap with the sources of the policies and/or resource descriptions).

Figure 1:
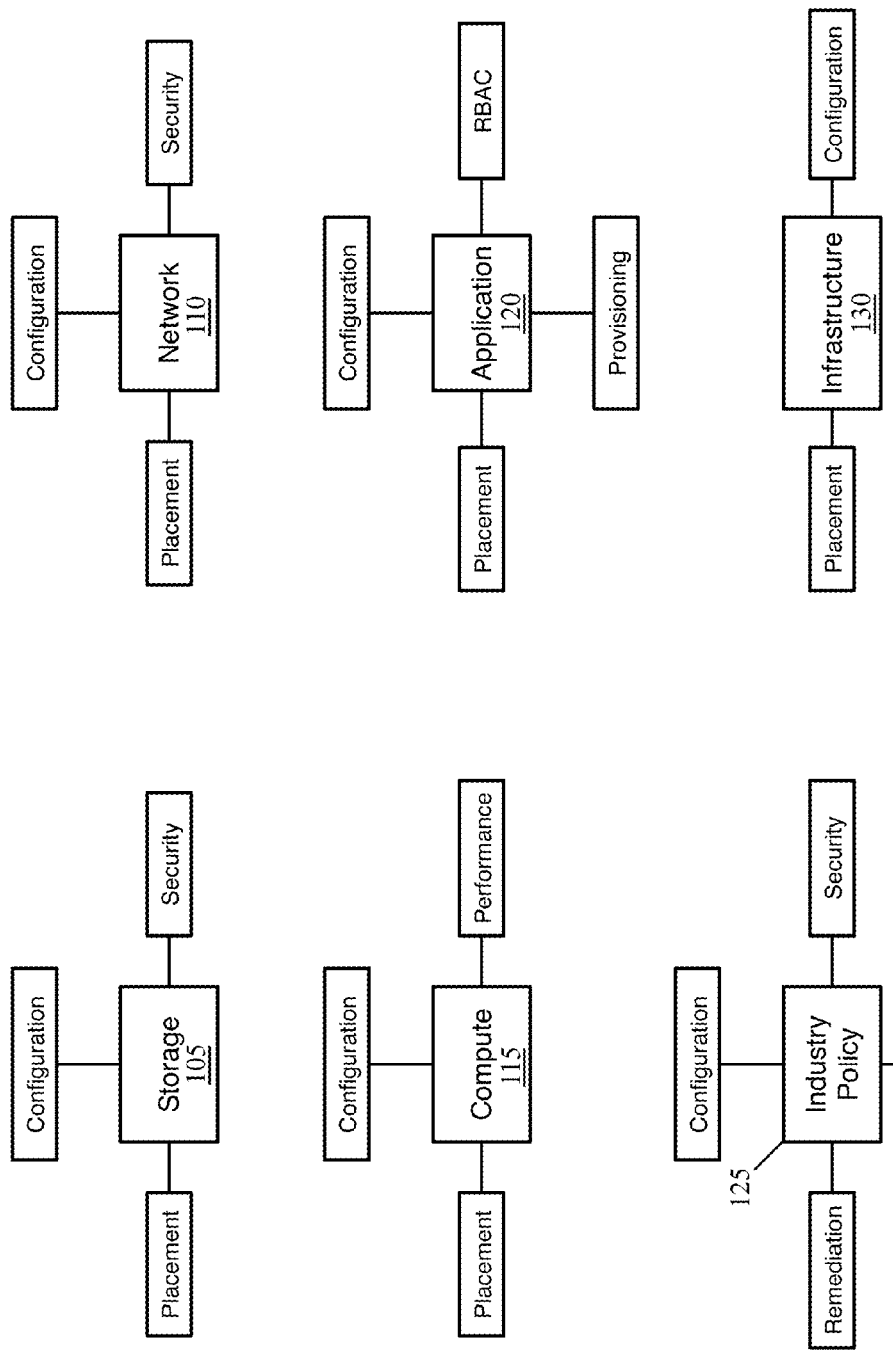
FIG. 1 illustrates an example of the policy sources and types of policies that might govern a set of computing resources.
Figure 2:
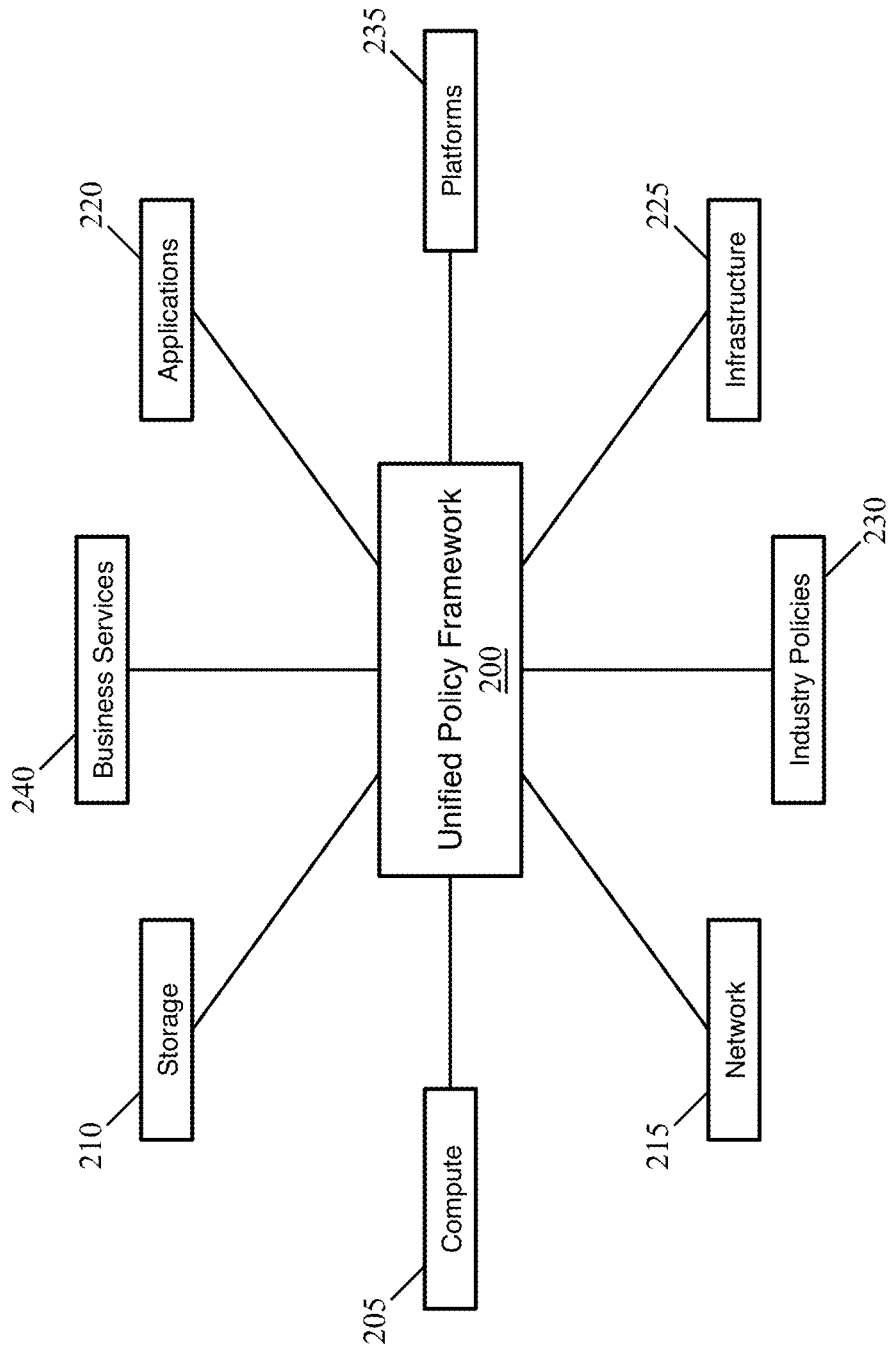
FIG. 2 conceptually illustrates a policy unification framework of some embodiments.

FIG. 2 conceptually illustrates such a policy unification framework 200 of some embodiments. Rather than the various management entities (e.g., management software) of FIG. 1 enforcing their own disparate policies, in this case all of these various services connect into the unified framework 200. That is, a compute manager 205, storage manager 210, network manager 215, applications manager 220, infrastructure manager 225, industry policies and standards manager 230, platform manager 235, and business services manager 240 all provide policies to the policy unification framework 200. The policy unification framework imports these policies (which may be written in various different descriptive or declarative languages), normalizes them, and binds the policies to various resources (descriptions of which may also be imported from the various services 205-240) according to sets of binding rules. The bound policies are then provided to the services 205-240, in order for these services to enforce the policies as bound to the resources. In some cases, some of the services 205-240 may act only as sources of the policies and/or resources, while other of the service may act only as policy engines to enforce the bound policies.

Figure 3:
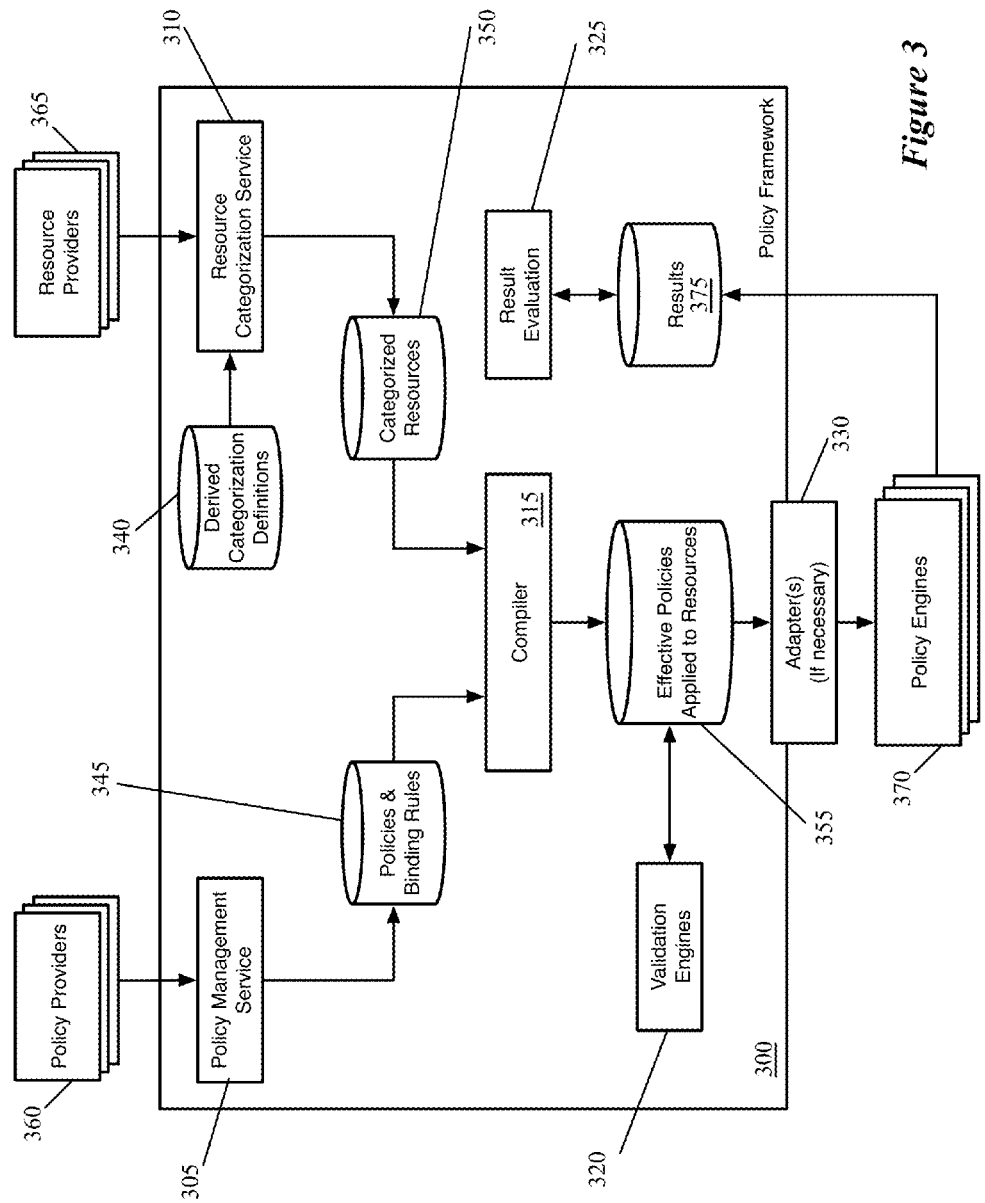
FIG. 3 conceptually illustrates the architecture of the policy unification framework of some embodiments in more detail.

FIG. 3 conceptually illustrates the architecture of the policy unification framework 300 of some embodiments in more detail. As shown, the framework includes a policy management service 305, a resource categorization service 310, a compiler 315, validation engines 320, and a result evaluation service 325. In addition, some embodiments include one or more adapters 330 for ensuring that policies bound to resources are consumable by policy engines 370. The policy unification framework also stores various data, including derived categorization definitions 340, policies and binding rules 345, categorized resources 350, effective policies applied to resources 355, and results 375.

The policy management service 305 of some embodiments automatically ingests policies from various heterogeneous policy providers 360 (e.g., network managers, storage managers, compute server managers, industry standards, etc.) and stores these policies in the policies and binding rules store 345. The policy management service also handles other operations on the policies, such as responding to queries regarding the policies, updating policies, adding/removing policies, etc.

These imported policies may be written in a variety of different languages (usually standards based or proprietary domain-specific languages, such as datalog, various different XML or JSON schemas, SCAP, rule languages, etc.) with different encodings (e.g., XML, JSON, plaintext, etc.), but upon import are stored in a normalization wrapper such that all policies have the same representation within the unified framework. The normalization wrapper of some embodiments provides the policy with a name and group (or namespace, which allows multiple different policies to have the same name so long as they do not also share a common namespace), and stores the content of the policy (e.g., the policy as written in the datalog, XML schema, JSON schema, etc. used by the policy provider) as another field of the wrapped policy. In some embodiments, the normalization also includes a version number, which allows for multiple versions of the same policy to be stored by the system.

The imported policies, in some embodiments, are stored as primitive (also called atomic) policies. The primitive policies represent a single policy, with the policy content defined within a field of the policy wrapper. From these primitive policies, users of the policy unification framework can define composite policies, that refer to the primitive policies. A composite policy, in some embodiments, may involve a reference to a single primitive policy (e.g., in order to provide parameters for the primitive policy) or to multiple primitive policies. In addition, composite policies may refer to other composite policies.

The policies and binding rules store 345 stores these primitive policies, as well as the composite policies that reference the primitive policies. The compositions, in some embodiments, may be part of the policy framework as acquired by a datacenter manager (e.g., part of a shipped product), or may be generated by the datacenter manager (e.g., through a user interface provided by the framework). For instance, an enterprise might acquire the policy framework customized for a particular industry in which the enterprise participates, with a set of composite policy rules customized for the industry (generated based on a knowledge of the type of policies that will be imported from the various policy providers 360). In addition, the datacenter manager (or any authorized user of the policy framework, such as a network administrator, etc.) may generate additional composite policies by defining the composites through a user interface. As described below, in some embodiments the policy unification framework provides a standardized composition language that allows the user defining composite policies to easily reference other policies, pass parameters between policies, apply functions to those parameters, and make policies conditional on various criteria. The policies and binding rules store 345 also stores binding rules for binding policies to resources, which will be described below.

In addition to the policy management service 305, the policy unification framework 300 of some embodiments also includes a resource categorization service 310 for ingesting and storing descriptions of the computing resources being managed from a set of heterogeneous resource providers 365. These resource providers 365 may overlap with the policy providers 360. For example, a network manager or compute manager might provide both policies defined within the management system as well as a list of resources managed by the management system. From each of the resource providers, the resource categorization service 310 reads in the descriptions of the computing resources managed by the source, which includes categories to which the resources belong. For instance, for a particular VM, the categories could include in which datacenter and/or rack and/or server it is located, which operating system it is running, whether it is an app server/web server/database server, etc., depending on from which resource provider the information about the VM is received. These resources may include any entity that either constitutes a managed datacenter or operates (as hardware or software) either within the managed datacenter or outside of a managed datacenter but in concert with the managed datacenter (e.g., a cloud resource). Examples of such resources may include VMs, containers, servers, server racks, power circuits, datacenters and/or subsections of datacenters, users, user groups, applications, operating systems, services, etc., though this listing is not meant in any way to be limiting.

Furthermore, the resource categorization service 310 of some embodiments derives additional categories for the resources based on the derived classification definitions 340. Like the policy compositions and binding rules, these definitions may be provided with the policy unification framework as acquired (e.g., as part of industry-specific or business size-specific content), or may be defined by the user (administrator) of the policy framework. One such type of derived category is for the categorization service to create an amalgamated category for resources that fall into any of several different individual categories that are effectively the same. For instance, multiple different types of resource providers might specify the datacenter in which a VM is located. While these would appear as different categories in the resource store 350, all of the resources could be tagged with a same derived category, which the binding rules can use to apply policies to all VMs tagged with the derived datacenter category. Similarly, the categorization service 310 might derive categories for resources that are categorized in a first category by a first source and a second category by a second source. As an example, an applications manager might provide a list of all VMs that operate a particular type of application, while the compute manager might identify on which host machines each VM operates, and a business services tracker or other data source might identify the manufacturer of each host machines. Using this data, the policy unification framework could create a derived category of host machines made by a particular manufacturer on which VMs running the particular application operate, if the manager desired to apply policies to this specific category of host machines.

The policies (both primitive imported policies and user-defined composite policies) are then applied to the resources by the compiler 315 based on a set of binding rules that are stored with the policies in the store 345. These binding rules may be defined by the user of the policy framework (e.g., a datacenter administrator) or may be built-in to the framework (e.g., as content provided along with the composite policy and derived category definitions. In some embodiments, each binding rule specifies, for a policy or set of policies (e.g., one or more composite and/or primitive policies), one or more categories of resources to which the policies will be bound. For instance, a policy might be bound to all VMs in a particular datacenter, all servers that host a particular type of VM, etc. The binding rules may specify bindings of both primitive policies and composite policies to the resources.

The compiler 315 of some embodiments uses the binding rules to generate, for each resource for which information is stored by the system, a set of effective policies 355 to apply to the resource. This compilation process flattens the composite policies that are applied to the resource, such that the effective policies specify all of the primitive policies to apply to the resource. These effective policies can then be consumed by various policy engines 370 (which may be the same as the sources that provided some of the policies and/or resource descriptions in the first place). In addition, some embodiments allow for the inclusion of specific exceptions to policy binding rules (i.e., to not apply policy X to a specific resource A, even if A belongs to a category of resources to which the policy is otherwise applied). In some cases, adequate explanations may be required as documentation for those exceptions (e.g., for audit-related purposes). This allows the datacenter administrator to primarily use the binding rules to easily apply policies to large classes of resources and only provide specifics for the exceptions, rather than the administrator needing to specify to apply the policy to each separate resource in the category.

In some embodiments, as mentioned, the policies are wrapped in a normalization wrapper in order for policies from a variety of heterogeneous sources to be treated in the same manner by the policy framework, and easily composed into composite policies and applied to resources. The composition language used for this normalization wrapper allows for the compiler 315 to easily determine how to flatten a composite policy, as it need only read the information in the normalization wrapper, and does not need to delve into the specific content of the policy (e.g., the policy as written in the datalog, XML schema, JSON schema, etc. used by the policy provider and consumer).

In addition to treating the policy definition as a blob of content, the wrapper allows for easy composition and use of parameters to customize policies. In some embodiments, a primitive policy may include unspecified parameters, while composite policies that refer to that primitive policy specify the values of the parameters for a particular instance of the primitive policy. As an example, a policy specifying limits on VMs for a group might leave open the min/max memory, processor usage, disk space, etc. allowed for a VM. Different groups that have resources in the datacenter can then define composite policies that refer to the primitive policy, specifying different values for these parameters. In addition, the composition language of some embodiments allows the parameters to be defined by references to values found elsewhere (e.g., passed down from a higher-level composite policy, defined by a resource to which the policy is applied, etc.) or be a function of one or more values (e.g., a Max or Min function of multiple values that may be provided to the policy. Furthermore, the composition language allows conditional policy references in some embodiments. For instance, a composite policy might refer to a first primitive policy if a condition is met and a second primitive policy if the condition is not met. Similarly, the composite policy might refer to the same primitive policy, but pass different parameters depending on whether or not the condition is met. When computing the effective policies, the compiler 315 of some embodiments identifies these parameters to map from the composite policies to the applied primitives contained by those composite policies (or queries a specified source or the user for the parameter values), evaluates any functions or conditional operations specified in the composite policy wrapper, etc.

As shown, the policy unification framework of some embodiments also includes a policy validation engine 320 within the policy unification framework. The application of heterogeneous policies from several frameworks may create conflicts, and the policy validation engine provides rules for resolving such issues within the framework (e.g., deciding which policy supersedes the other, notifying the administrator of the issue, etc.). As with the other input data, these validation rules may be content provided with the product, input by the administrator, or a combination thereof. As an example, a first policy might require a certain type of VM to be allocated at least 32 GB of RAM, while a second policy caps the maximum amount of RAM allocated to any VM at 16 GB. In this case, these policies would conflict, and the validation engine would have to either remove both policies, have a rule for which policy should supersede the other or have a remediation rule that takes a custom action to resolve the conflict.

The effective policies 355 bound to the resources are provided by the framework 300 to the policy engines 370, using adapters 330 if necessary to translate the policy bindings in a manner readable by the different policy engines 370. At least some of these policy engines 370 may be the same management systems that provided policies and/or resources. In some cases, a policy provided by a first policy provider 360 is enforced by that same provider as a policy engine 370, applied to a resource based on information provided by a different resource provider 365.

As the policy engines 370 apply the policies within the datacenter or other computing environment, the results are fed back into the framework and stored in the results storage 375 for evaluation by the results evaluation engine 325. In some embodiments, the results evaluation engine 325 determines whether the policies are being applied correctly by the policy engines 370 in the operating environment, and whether the environment is compliant with the policies in force. In some embodiments, the results evaluation engine 325 provides reports to the user (e.g., the datacenter administrator) indicating any issues with the enforcement of policies. This allows the user to make any necessary changes to the policy definitions and compositions, binding rules, validation rules, etc.

The policy unification framework of some embodiments also provides a user interface that allows an administrator of the system to view the policies, binding rules, and resources of the system. In some embodiments, the administrator can use the UI to create and edit composite policies, binding rules, resource category derivation rules, and validation rules. When creating and editing the composite policies, the user may define how the policies are composed according to the policy composition features allowed by the composition language (e.g., define conditions for referencing policies, provide the parameters for the policy references, etc.).

The above description introduces the policy unification framework of some embodiments. Several more detailed embodiments are described below. First, Section I describes the import of policies from multiple sources, while Section II describes the import of resource information from multiple sources. Section III then describes binding rules and the compilation of the policy and resource information to arrive at effective policies for the resources. Next, Section IV describes the composition language of some embodiments. Section V then describes the validation of effective policies, and Section VI describes the user interface of the policy unification framework of some embodiments. Finally, Section IV describes an electronic system with which some embodiments of the invention are implemented.

I. Policy Import

Figure 4:
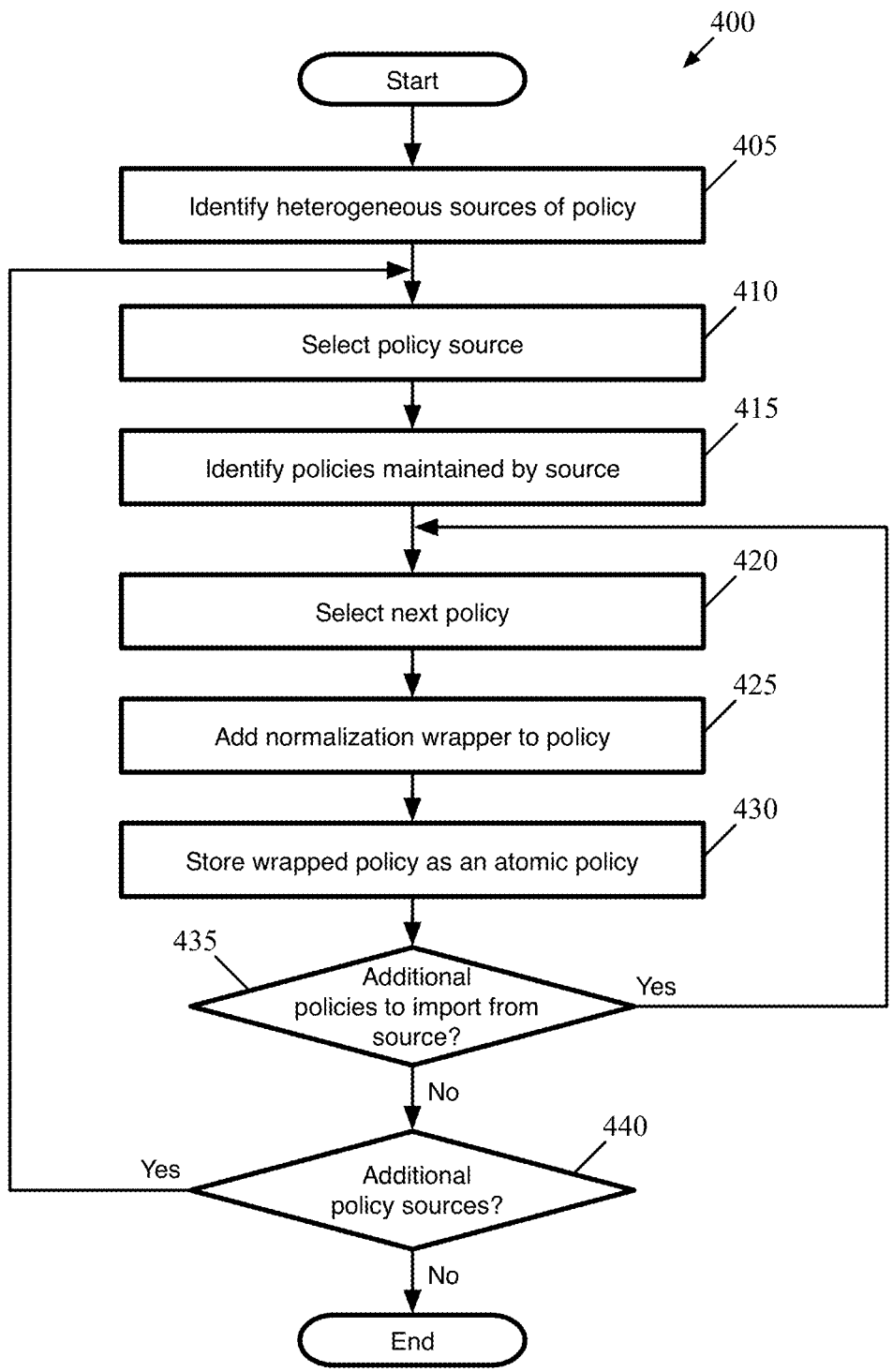
FIG. 4 conceptually illustrates a process performed by the policy store interface of some embodiments for importing policies and ensuring that the policies are stored in the policy store with a policy normalization wrapper.

As described above, the policy unification framework of some embodiments imports primitive (or atomic) policies from a variety of heterogeneous sources and stores them in a normalized fashion in a policy store. FIG. 4 conceptually illustrates a process 400 performed by the policy store interface (e.g., the policy management service 305) of some embodiments for importing policies and ensuring that the policies are stored in the policy store with a policy normalization wrapper. Though shown as a single linear process for importing all policies from a variety of sources, it should be understood that in some embodiments the policy framework performs an initial import of policies when a policy provider is connected to the framework, but also continues to monitor the source for changes to the policies (e.g., additional policies, removal of policies, changes of policy definitions, etc.) in case they are modified via the interface of the policy source.

As shown, the process 400 begins by identifying (at 405) heterogeneous sources of policy. In some embodiments, the policy unification framework is part of a suite of products for managing a computing environment such as a software-defined datacenter (SDDC), and easily connects to these sources of the policies. The policy framework of some embodiments can be configured to accept policies from any other types of sources as well. In addition, separate from the automatic import, in some embodiments an administrator may write policies directly through the user interface of the policy framework. Some examples of the heterogeneous policy sources include various management software, such as a network manager, storage manager, compute manager, specific network policy evaluation engines, as well as other sources such as industry standards, infrastructure and finance tracking software, business services, etc.

The process then selects (at 410) one of the policy sources from which to import policy definitions, and identifies (at 415) the policies maintained by the source. Different sources may store their policy definitions in different manners, and thus the import process may be different depending on the source. For instance, some policy providers store each policy as a separate entity in the system, while other policy providers require parsing to identify the separate policies. The policies, as stored by the individual policy providers, may be user created or be part of the policy provider system.

The process 400 selects (at 420) one of the policies stored by the current policy source for import. If necessary (i.e., if not handled by the policy source), the process adds (at 425) a normalization wrapper to the policy. Some policy sources supply their policies to the unified framework as content written in the native language understood by the policy source, and an adapter is required for ingesting policy from the source. In some cases, the policies are provided as a single stream of content, and the adapter module of the policy framework parses the policies into discrete policy units (based on, e.g., indicators in the native policy language that mark the end of one discrete policy and the beginning of another). Other sources are configured for easy interaction with the policy framework, and provide the policies in the unified representation format of the policy framework, with the policy content already embedded in a field of the policy normalization wrapper. In such cases, the process does not need to add the normalization wrapper itself.

The process 400 then stores (at 430) the wrapped policy as an atomic policy for use in composite policies, and so that the atomic policy may be bound to resources. The normalization wrapper of some embodiments includes fields for a name as well as a namespace, a version number, and the policy content. The namespace allows for multiple policies to have the same name, so long as the namespace is different (i.e., no two policies within the same namespace may have the same name). Thus, multiple policies with the name "Firewall" or "Security Settings" could exist, so long as these policies were maintained in different namespaces (e.g., "Finance:Firewall" and "R&D:Firewall".

The version number allows for multiple versions of policies to be stored, with the composition language of some embodiments providing a mechanism for referencing the different versions. In addition, the normalization wrapper may also contain metadata, to encode additional information such as the source of the policy or other information (which may be customized by the user of the policy framework, in some embodiments). In some embodiments, when the policy source does not provide the policy in the normalized format, the adapter of the policy ingest service that handles adding the normalization wrapper reads the namespace, name, and version information from the content in its native format. When the name, namespace, and/or version are not available in the imported policy data, the adapter of the policy ingest service of some embodiments requests that a user of the policy framework provide the info. Some embodiments, after performing an import, present a list of missing data to the user through the user interface, or store such a list so that the user can access (and edit) the information upon request. In some embodiments, when the name, namespace, and/or version (or other required or expected metadata) are not available for an adapter to read, the adapter generates this information. For instance, all information from a particular source might be given the same namespace, with naming done incrementally (e.g., "Network_Policy_1", "Network_Policy_2", etc.). Some embodiments automatically refer to the version number as 1.0 when the information is not provided or extractable from the policy. In addition, in some embodiments a policy may require parameters to be filled in at the time of import (although as described below, some embodiments store policies without the parameters filled in, and these parameters are completed at compilation time). In this case, the import service may request these parameters from the user interface, or store the policy without the parameters but maintain a flag that the policy requires the parameters to be complete.

After importing and storing the current policy, the process 400 determines (at 435) whether any additional policies remain to be imported from the current source. When additional policies remain, the process returns to 420 to import the next policy. Otherwise, the process determines (at 440) whether any additional policy sources remain from which to import policies. If there are more sources, the process returns to 410 to import the policies from the next source. Otherwise the process 400 ends.

It should be understood that, though a policy store interface implementing the process 400 operates in an active manner by pulling policy content from the various policy sources, in some embodiments the policy store interface operates more passively, responding to commands received from the policy sources (e.g., the policy providers 360). Rather than requesting policy information from these various sources, the policy store interface of some embodiments acts in response to import (or similar) commands from the policy providers to store their policies. These policies, as in the above-described case, may already have normalization wrappers added by the policy provider. When the policy source does not have the functionality to wrap its policies, the policy source interacts with an adapter which performs the metadata extraction and policy normalization. The adapter then interacts with the passive interface in the same way as a policy provider would otherwise, sending commands to the interface to store the wrapped policies. Such a passive policy store interface may also respond to queries from the policy providers with information from the policy store, as well as modifying or removing the policies based on commands from the provider.

Figure 5:
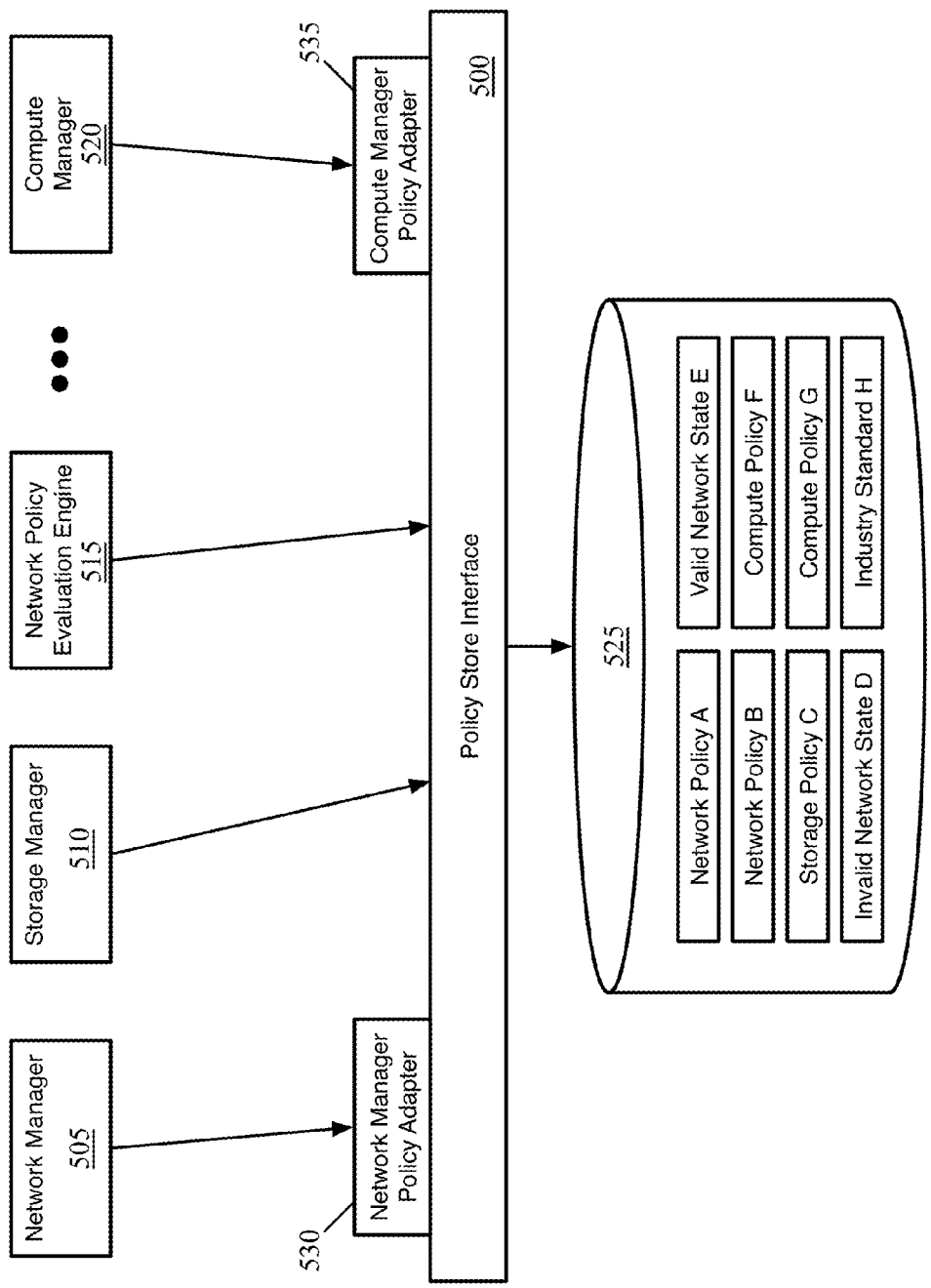
FIG. 5 conceptually illustrates a policy store interface that imports policies from various heterogeneous sources and stores policies imported from these sources into a policy store.

FIG. 5 conceptually illustrates a policy store interface (policy ingest service) 500 that receives policies from various heterogeneous sources 505-520 and stores policies ingested from these sources into a policy store 525. As shown, the policy sources in this case include at least a network manager 505 (e.g., the VMware NSX network management controllers), a storage manager 50 (e.g., the VMware vSan controllers), a network policy evaluation engine 515 (e.g., the OpenStack service Congress), and a compute manager 520 (e.g., the VMware vSphere controllers). Each of these sources provides policies (either user-defined policies or policies that come with the product) to the policy store 525 of the policy unification framework through the policy store interface 500. In this case, the network manager 505 and compute manager 520 require adapters 530 and 535 respectively, because they provide policy without the normalization wrapper. This could be due to the network manager 505 and compute manager 520 being non-standard products for the policy framework (e.g., not specifically designed to interface with the policy framework). However, due to the extensibility of the policy framework, in most cases an adapter for such policy sources can be designed, so long as there is a way to identify the discrete policies from the source.

In this example, the policy store 525 indicates that two network policies (Policy A and Policy B) have been imported from the network manager 505 (e.g., stateful firewall policies, port security rules, etc.), a storage policy (Policy C) has been imported from the storage manager 510 (e.g., replication requirements for different types of data), valid and invalid network states (Invalid State D and Valid State E) have been imported from the network policy evaluation engine 515 (e.g., definitions of valid and invalid network group membership configurations), two compute policies (Policy F and Policy G) have been imported from the compute manager 520 (e.g., VM resource requirements), and an industry standard (Standard H) has been imported from another source (not shown). In this case, all of the illustrated policies are atomic policies, containing the content of the policy. These atomic policies are wrapped in a normalization wrapper such that the policy store and the various modules of the policy unification framework treat all of the policies in the same manner, even if the policies are written in different languages (e.g., the invalid network state D and valid network state E could be written in datalog while the compute policies are written in a specific XML schema).

Figure 6:
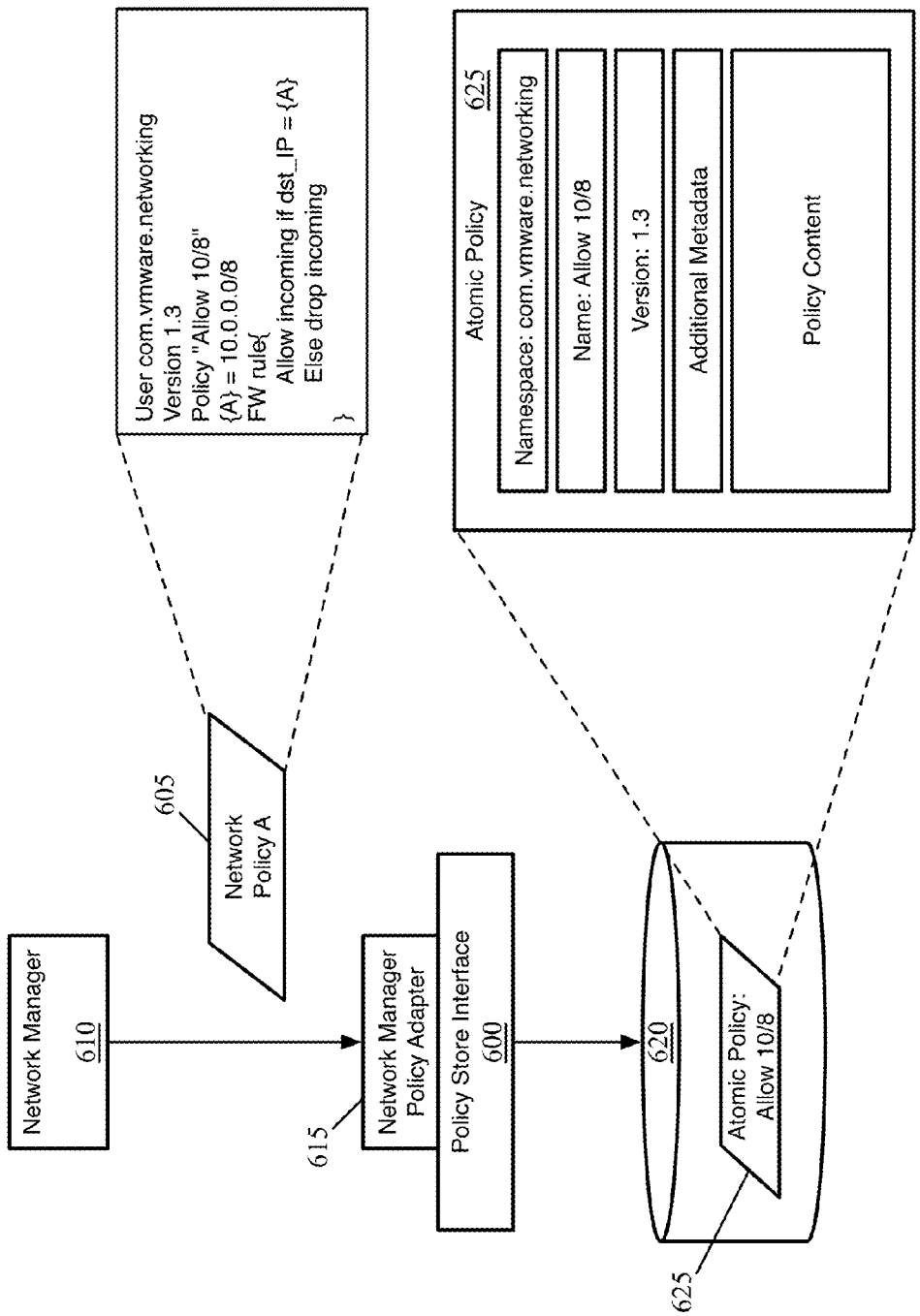
FIGS. 6 and 7 conceptually illustrate the receipt by the policy store of network policies and the subsequent policy normalization wrapping applied by the interface to these policies.
Figure 7:
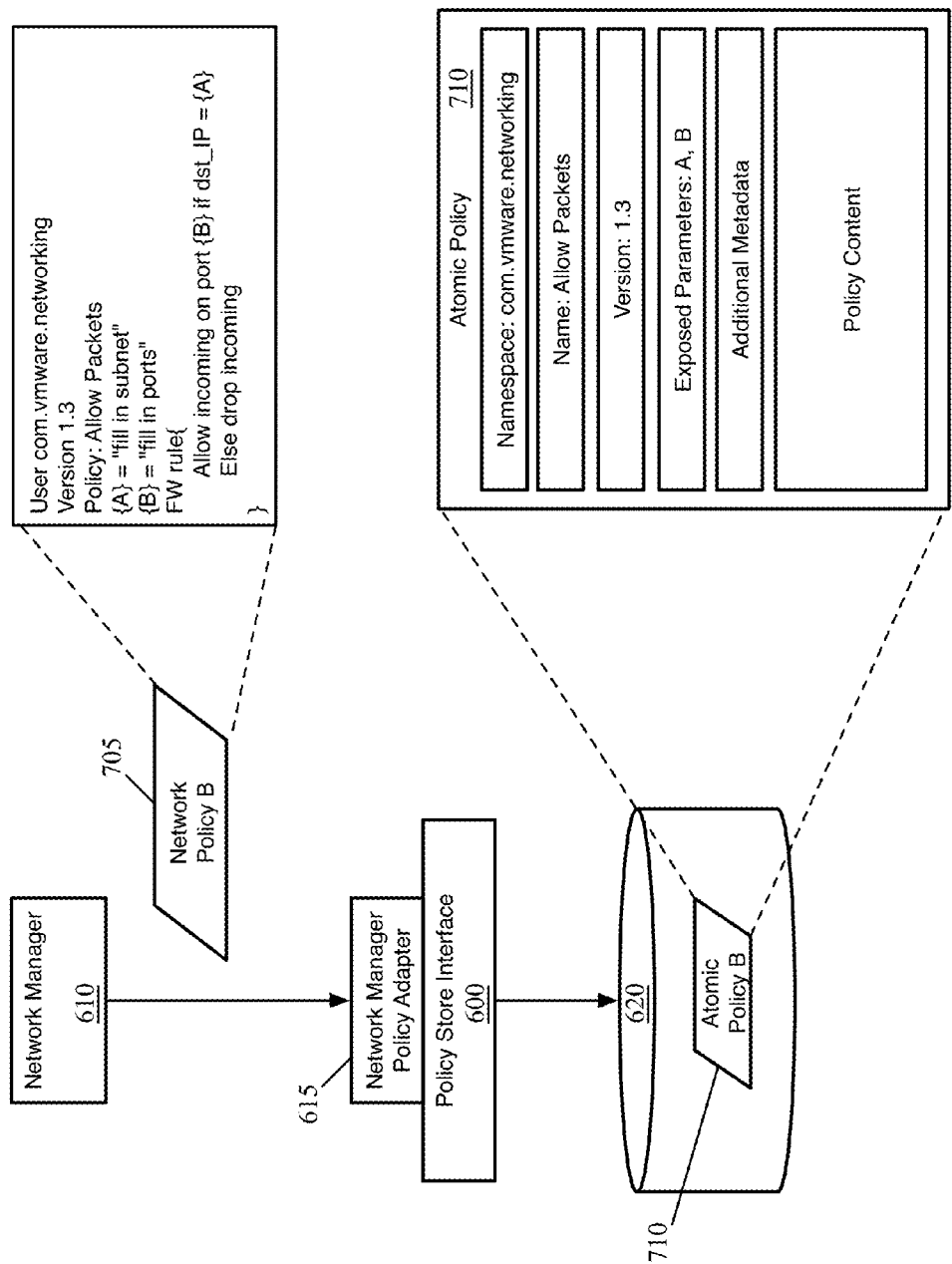

FIGS. 6 and 7 conceptually illustrate the receipt by the policy store of network policies and the subsequent policy normalization wrapping applied by the interface to these policies. FIG. 6 specifically illustrates a policy store interface 600 receiving a network policy 605 from a network manager 610 and storing the policy in a policy store 620. The policy store interface 600 also includes an adapter for reading policies received from the network manager 610 and translating the data contained in the policy into the wrapper used by the policy framework.

As shown, the policy store interface 600 receives the network policy 605 written in a language used by the network manager 610. Shown as a pseudocode in this example, the policy data indicates that the policy is created by the user (e.g., a group) com.vmware.networking, is version 1.3 of this policy, and has a name of "Allow 10/8". The content of the policy sets a value for the subnet "A" as 10.0.0.0/8, and then includes a firewall rule to allow incoming packets only if the destination IP address is in this subnet A.

Upon receiving the network policy 605, the network manager policy adapter 615 built into the policy store interface 600 (or operating as a separate entity from the policy store interface, in other embodiments) parses the policy to identify the relevant details and puts this information into the policy wrapper to create a normalized atomic policy 625. The atomic policy 625, as shown, includes fields for the namespace (com.vmware.networking), the name (Allow 10/8), the version (1.3), additional metadata (e.g., the source of the policy, which would indicate the name of the network manager 610), and the policy content (the actual firewall rule definition). The adapter 615, in this example, is designed to identify this information in the language received from the network manager 610 specifically (whereas adapters for other policy sources are designed to parse differently formatted policy information).

FIG. 7 illustrates the policy store interface 600 and network manager policy adapter 615 receiving a second network policy 705 from the network manager 610, written in the policy definition language of the network manager. The policy 705 is similar to the policy 605 in that it has the same namespace, name, and version number, which the network manager policy adapter 615 uses to generate a policy wrapper for the policy content received from the network manager.

However, unlike the policy 605 in the previous figure, the policy 705 also has two variables to be filled in as parameters. In some embodiments, as described in greater detail below, this information may be filled in later via a reference to the atomic policy that passes the parameters to the policy. Thus, the network manager policy adapter 615 identifies the language in the policy content 705 that indicates parameters to be exposed, and exposes these parameters within the normalization wrapper for the policy 710. In some other embodiments, either the adapter or a more active policy store interface will query the user interface to provide values for these parameters at the time of ingest.

Figure 8:
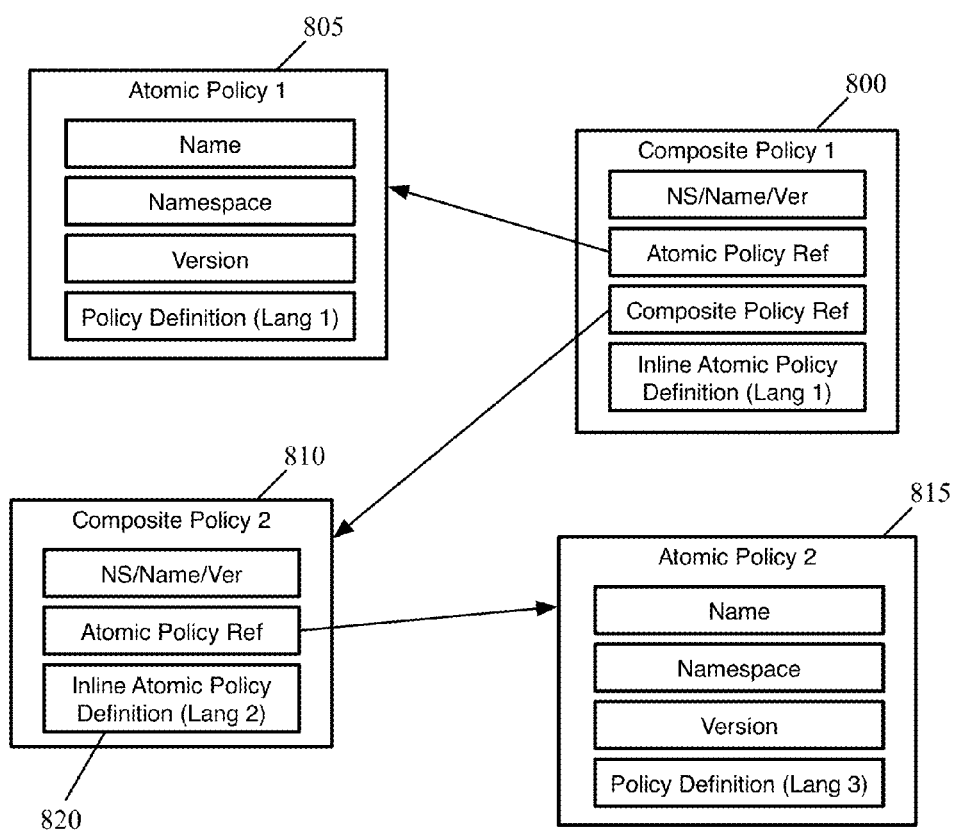
FIG. 8 illustrates an example of a composite policy and its various component policies.

FIG. 8 illustrates an example of a composite policy 800 and its various component policies. As shown, the composite policy 800 includes a namespace, name, and version, similar to the atomic policies described above. In some embodiments, only atomic policies are given these fields, while in other embodiments each policy definition, whether atomic or composite, includes a namespace, name, and version (which allow other composite policies to accurately refer to it). The composite policy 800 also includes a reference to a first atomic policy 805, a reference to a second composite policy 810, and an inline atomic policy definition 815.

The inline atomic policy definition 815 is written in a first policy definition language (e.g., a first XML schema). The administrator, when defining the composite policies, may include both references to atomic policies as well as inline definitions of policy. Inline definitions provide the advantage of not cluttering the policy store with policies that are only used within the context of a single composite policy. However, the inline policy cannot be referred to by other policies without reference to the entire composite. As such, policies that are stored without parameters and get their parameter values through the reference from a composite policy are better written as separate atomic policies.

The atomic policy reference in the first composite policy 800 refers (by name, namespace, and version) to an atomic policy 805. As shown, the atomic policy 805 includes these identifying fields as well as a policy content field, with the policy definition written in the same language as that of the inline atomic policy 815. The composite policy reference in the first composite policy 800 refers (by name, namespace, and version) to a composite policy 810. This composite policy 810 includes the identifying fields as well as a reference to a second atomic policy 815, and an its own inline atomic policy definition 820, written in a second language (e.g., datalog). The second atomic policy 815 includes the identifying fields as well as its own policy definition, in a third different policy definition language (e.g., a second XML schema). As shown, different atomic policies may be written in various different languages, but are easily composed using the normalization wrappers that provide an abstraction on top of the actual policy definition. In addition, this figure indicates that composite policies may refer to other composite policies, which can be grouped ad infinitum in some embodiments. The policy composition language of some embodiments will be described in greater detail below in Section IV.

II. Resource Categorization

In addition to importing policy definitions, the policy unification framework of some embodiments imports resource specifications from a variety of heterogeneous sources, which may partially or completely overlap with the sources of policy (but may also include other sources that do not provide policies to the framework). These resource specification identify the resource (e.g., by a UUID or other name), as well as provide category information about the resource. The category information may specify the type of resource (e.g., VM, host machine, switch, router, application, etc.) as well as additional information about the resource (e.g., whether a VM is a webserver, app server, etc., what type of VMs are hosted on a host machine, whether a host machine is compliant with a set of standards, whether an application is stand-alone or distributed, or any other categorization information that may be stored by the various resource management tools.

Figure 9:
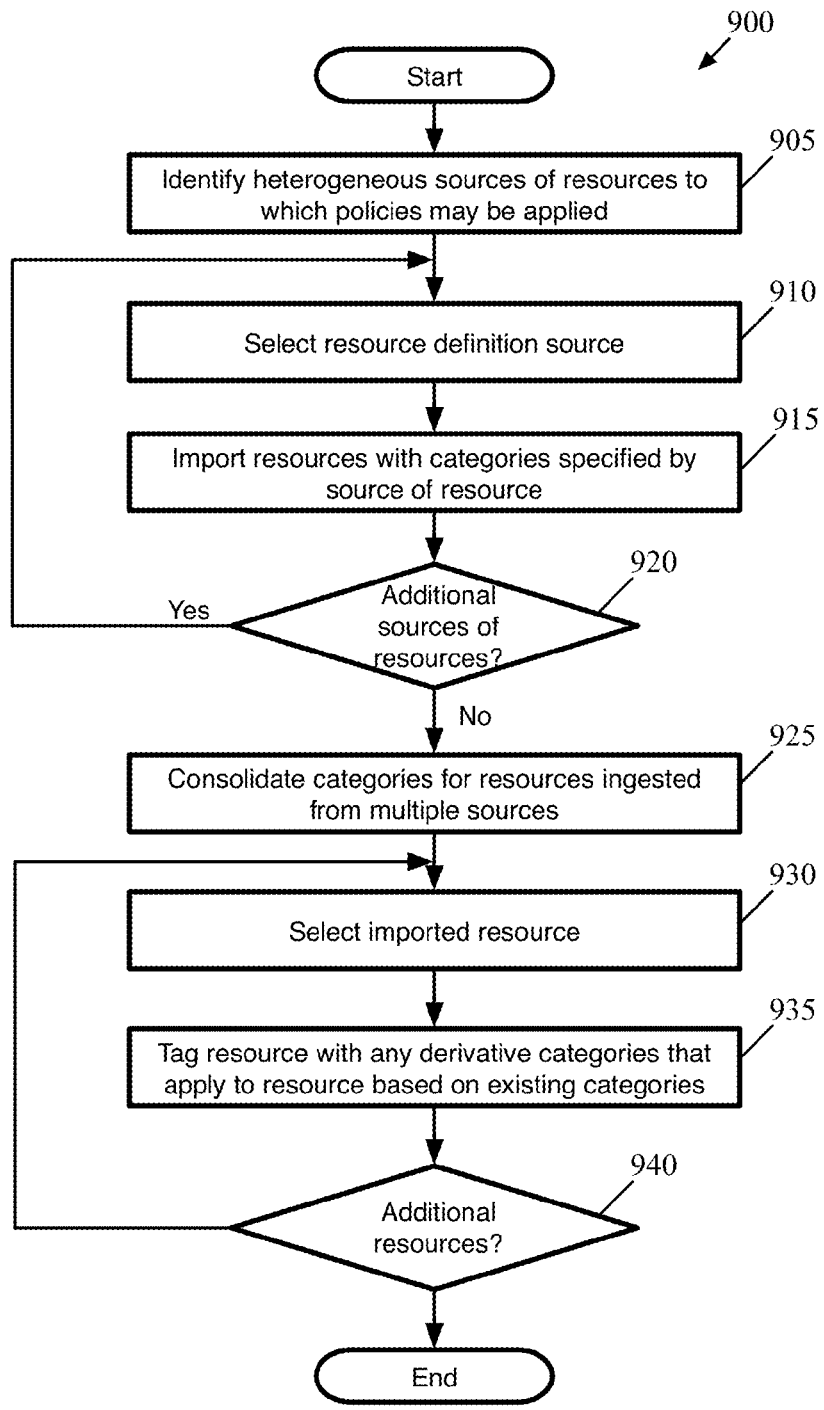
FIG. 9 conceptually illustrates a process performed by a resource categorization service of some embodiments for ingesting resource category specifications from various sources and deriving additional categories for the resources.

FIG. 9 conceptually illustrates a process 900 performed by the resource categorization service (e.g., the resource categorization service 310 of FIG. 3) of some embodiments for ingesting resource category specifications from various sources and deriving additional categories for the resources. Though shown as a single linear process for ingesting all of the resource information from multiple sources, it should be understood that in some embodiments the policy framework performs an initial ingest of resource information when a particular resource provider is connected to the framework, but also continues to monitor the source for additional resource information (e.g., new resources, removal of resources, changes in the categorization of a resource, etc.).

As shown, the process 900 begins by identifying (at 905) heterogeneous sources of resources to which policies may be applied. In some embodiments, the policy unification framework is part of a suite of products for managing a computing environment such as a SDDC, and easily connects to these managers of resources. The policy framework of some embodiments can be configured to ingest resource definitions from other types of sources as well, such as non-standard products, databases of resource information not directly involved in the management of the resources (e.g., financial tracking information, business service designations, etc.), user input, or other sources.

The process then selects (at 910) one of the sources of resource definitions, and imports (at 915) from the selected source the resource definitions with categories for each resource specified. The various different sources may provide this information about their resources in different manners. For instance, in some embodiments the management software may store a database of the resources that it manages, and imports the information via this database. As an example, a compute manager might have a first database table of all of the hosts in the computing environment, a second database table of all of the VMs in the environment, and a third database table of all of the non-VM containers operating in the environment. Each row in a particular table might represent a resource, and at least some of the columns provide categorization information about the resource (for a VM, for example, the categories could specify which operating system the VM runs, whether the VM is an app server, web server, etc., the server and/or rack and/or datacenter in which the VM operates, etc.

In other cases, the resource providers might store the resource information as objects, with an object created for each resource and the categorization information stored as variables of the object. A network manager, as an example, might store VM objects, and include information such as its location in the network, the logical network to which the VM belongs, the MAC and IP addresses of the VM, etc. In some embodiments, the resource ingest system is easily extensible to accommodate different sources of resource information. For any data format provided by a new source, the administrator can create an adapter for translating data received in the new format into resources stored in a homogeneous manner by the policy framework.

As with the policy store interface, in some embodiments the resource categorization interface that implements the process 900 (or at least the import operations 905-920) may be a more passive interface that does not actively pull resource definitions from the resource information sources. That is, instead of pulling the resource definitions, the resource categorization interface acts in response to import (or similar) commands from the resource information providers to store their policies. In addition, some embodiments have a specific format or representation for the resource information, to which the sources convert their resource data. If necessary, the resource store interface of some embodiments uses an adapter to read the resource information and convert the information to the appropriate format. As with the policy store, some embodiments respond to queries regarding the resources from the resource information providers, as well as modify or remove resource information based on commands from the providers.

After importing the resource information from a particular selected source, the process 900 determines (at 920) whether there are any additional sources of resource information from which to ingest resource categorization data. When additional sources remain, the process returns to 910 to ingest data from another source of resource information.

Otherwise, the process consolidates (at 925) categories for resources ingested from multiple sources. As noted above, in some embodiments the various sources of resources identify the resources via a name, UID (unique identifier), etc. In some cases, the resources have names that are unique within a namespace (as in the case of policies), or names unique within a type of resource (e.g., VM, server, switch, etc.). Ideally, the name or UID for a particular resource is the same across different sources, allowing for the unified framework to identify that the resource information from a first source and the resource information from a second source in fact apply to the same resource. In this case, the resource categorization service consolidates this information into a single resource definition (e.g., a single row in a database table, or a single object), such that a single resource record has information from multiple sources.

Next, the process 900 determines whether to derive additional categories for the resources. The process selects (at 930) one of the imported resource definitions, and tags (at 935) the resource with any derivative categories that apply to the resource based on its existing categories. One such type of derived category is for the categorization service to create a category for resources that fall into any of several different individual categories that are effectively the same. For instance, multiple different types of resource providers might specify the datacenter in which a VM is located. While these would appear as different categories in the resource store 350, all of the resources could be tagged with a same derived category, which the binding rules can use to apply policies to all VMs tagged with the derived datacenter category. Similarly, the categorization service 310 might derive categories for resources that are categorized in a first category by a first source and a second category by a second source. As an example, an applications manager might provide a list of all VMs that operate a particular type of application, while the compute manager might identify on which host machines each VM operates, and a business services tracker or other data source might identify the manufacturer of each host machines. Using this data, the administrator of the policy unification framework could create a derived category of host machines made by a particular manufacturer on which VMs running the particular application operate, if the administrator desired to have policies applied to this specific category of host machines. Like the policy composition rules, derived category definitions may be provided with the policy unification framework as acquired (e.g., as part of industry-specific or business size-specific content), or may be defined by the user (administrator) of the policy framework.

The process then determines (at 940) whether any additional resources are in the system for which derived categories have not yet been determined. When additional resources remain, the process returns to 930 to select the next resource and perform the category derivation operations for the selected resource. Otherwise the process 900 ends.

Figure 10:
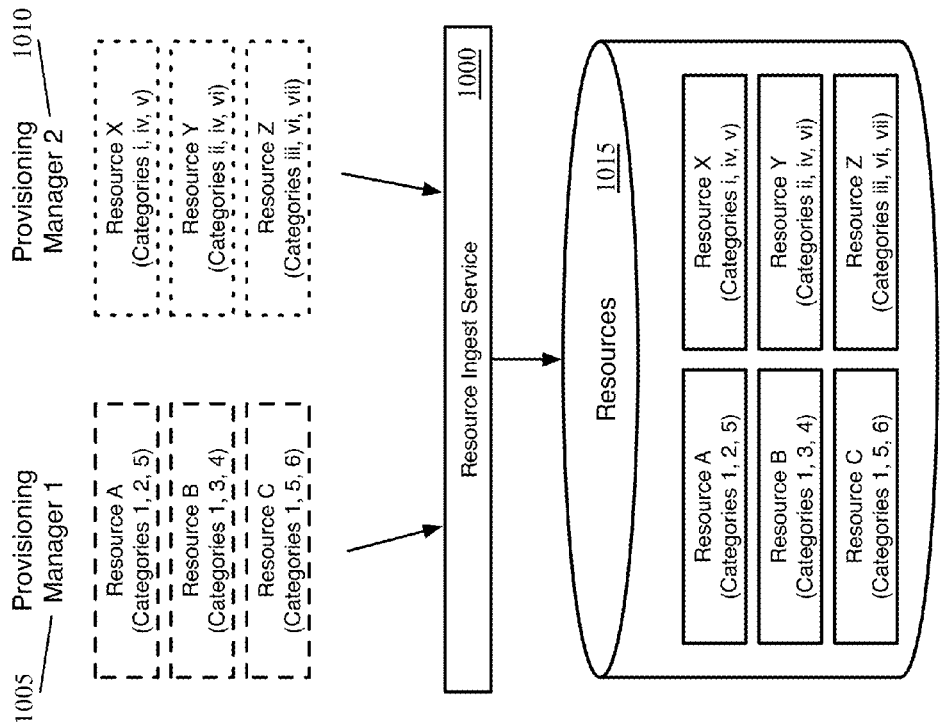
FIG. 10 conceptually illustrates an example of two different types of provisioning managers providing resource information to the resource ingest service of a policy unification framework, and that data being stored in a resource store of the policy framework.

FIG. 10 conceptually illustrates an example of two different types of provisioning managers 1005 and 1010 providing resource information to the resource ingest service 1000 of a policy unification framework, and that data being stored in a resource store 1015 of the policy framework. As shown, the first provisioning manager 1005 provides information on three resources A-C. Specifically, according to the data, all three of these resources belong to Category 1, which might represent a high-level type of resource, such as VM, server, etc. Resource A also belongs to categories 2 and 5, resource B also belongs to categories 3 and 4, and Resource C also belongs to categories 5 and 6 (i.e., there is some overlap in the additional categories, but also disparity between the categorization of the resources.

The second provisioning manager 1010 provides information on three resources X-Z. There is no single high-level resource type category to which all three of these resources belong, as they may include resources from different tables in the provisioning manager 1010 (e.g., one VM, one physical (software) switch, and one logical switch). Specifically, Resource X belongs to categories i, iv, and v, Resource Y belongs to categories ii, iv, and vi, and Resource Z belongs to categories iii, vi, and vii.

Each of the two provisioning managers 1005 and 1010 may provide the information about their respective computing resources in different formats. For instance, the information about Resources A-C is shown using dashed lines to indicate that this information is received the resource ingest service 1000 in a first format (e.g., as a set of objects), while the information about Resources X-Z is shown using dotted lines to indicate that this information is received by the resource ingest service 1000 in a second format (e.g., as database table records). However, as shown in the resource storage 1015, the resource ingest service stores all six of these records in the same format (indicated by the solid lines). As shown in the subsequent figures, if information about the same resource is received from both of the sources, then some embodiments consolidate this information into a single record.

Figure 11:
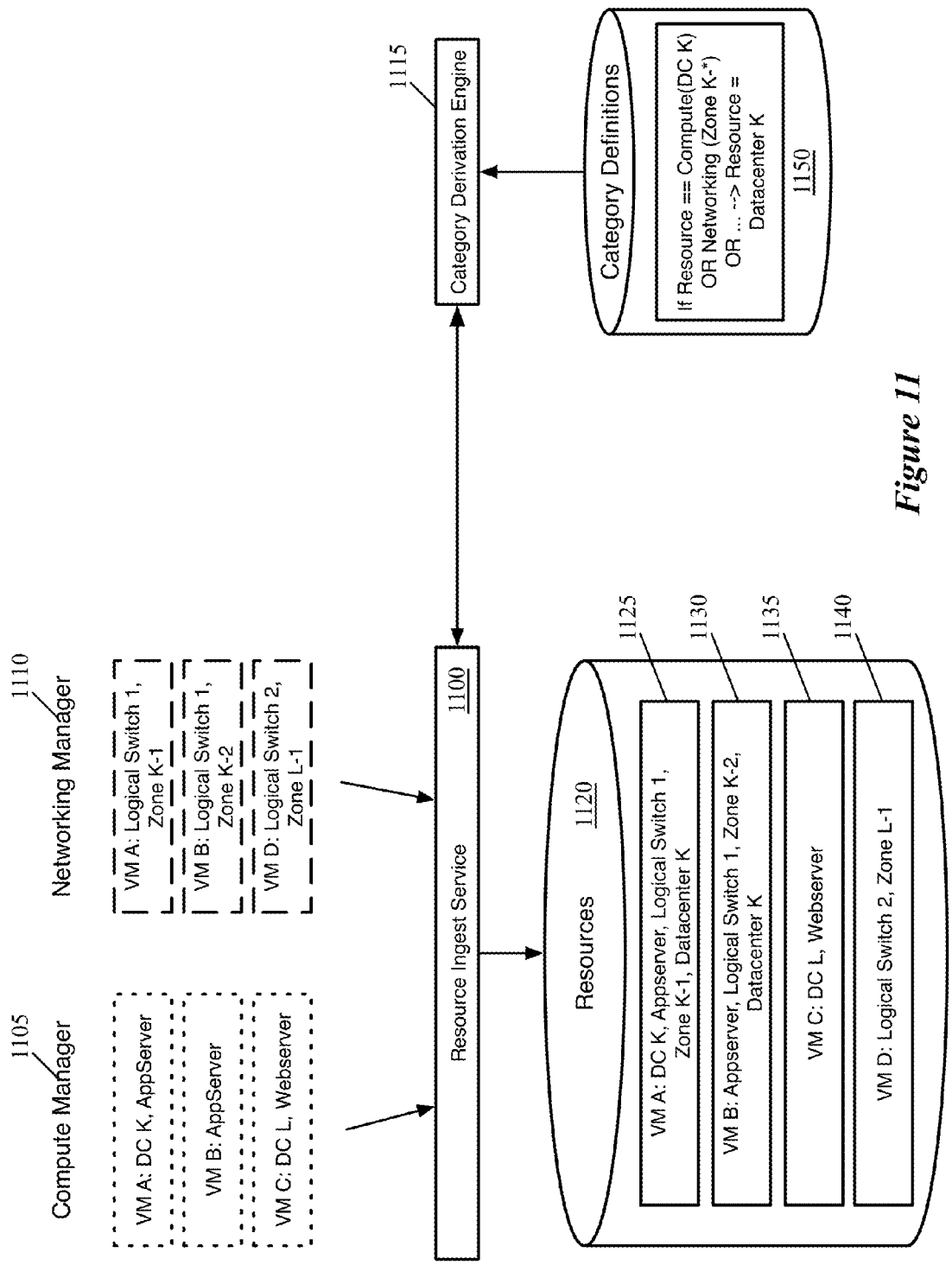
FIG. 11 conceptually illustrates an example of a resource ingest service that also uses a category derivation engine to generate additional categories to which resources ingested from various sources belong.

FIG. 11 conceptually illustrates an example of a resource ingest service 1100 that also uses a category derivation engine 1115 to generate additional categories to which resources ingested from various sources belong. In addition, this figure shows examples of the resource ingest service consolidating resource information from multiple sources before having the category derivation engine use its derived category rules to provide additional categories.

As shown, the resource ingest service 1100 receives resource information in a first format from a compute manager 1105 and resource information in a second format from a networking manager 1110. The compute manager 1105 provides information about three VMs: VM A, VM B, and VM C (where A, B, and C represent UIDs, in some embodiments). Specifically, the compute manager 1105 indicates that VM A is located in datacenter K and is an application server, that VM B is also an application server, and that VM C is located in datacenter L and is a webserver. The datacenter information for VMs A and C is provided in a first format, shown as "DC".

The networking manager 1110 provides information about three VMs as well: VM A, VM B, and VM D. In this case, the networking manager 1110 indicates that VM A belongs to logical switch 1 and is located in zone K-1 (i.e., the zone 1 of datacenter K), that VM B belongs to logical switch 1 and is located in zone K-2, and that VM D belongs to logical switch 2 and is located in zone L-1.

The resource ingest service 1100 consolidates this information from six records (or objects, etc., depending on the format of the received data) into four records 1125-1140 in the resource information storage 1120. The first record 1125, for VM A, includes the categories indicating that the VM is located in DC K, that the VM is an application server, that the VM is on logical switch 1, and that that the VM is located in zone K-1. The second record 1130, for VM B, includes categories indicating that the VM is an application server, that the VM belongs to logical switch 1, and that the VM is in zone K-2. The third record 1115, for VM C, only includes the information from the compute manager 1105, while the fourth record 1140, for VM D, only includes the categories from the networking manager.

In addition to consolidating the category information, the resource ingest service 1100 also passes the consolidated data to the derived category engine 1115 to determine, for each resource, whether any derived categories apply to the resource. In this case, the compute manager 1105 indicates the datacenter in which a VM is located in a first manner while the networking manager 1110 indicates the datacenter in which a VM is located in a second manner (identifiable based on the zone). However, a computing environment administrator will typically want to have the policy unification framework apply policies to all resources (or all VMs) located in a datacenter (or any other category that is provided differently by different resource information sources), irrespective of what specific management software identifies that the resource is located in the datacenter. Rather than facing the cumbersome task of creating binding rules for all of the separate categories that indicate the same thing (for each policy that needs the binding rules), some embodiments allow the administrator to create derived categories (or come pre-configured with such derived categories).

In this case, as shown with pseudocode in the derived category rule storage 1150, if a resource belongs to either the "DC K" category from the compute manager OR the "zone K-*" category (where * indicates a wildcard number) from the networking manager OR any other category indicative of location in datacenter K, then the record for the resource is tagged as belonging to the category Datacenter K. As a result, the records 1125 and 1130 include the category of "Datacenter K" to indicate that both of these resources are located in that datacenter. If the derived category definitions included a separate rule for datacenter L, then the records 1135 and 1140 would be tagged as such.

Figure 12:
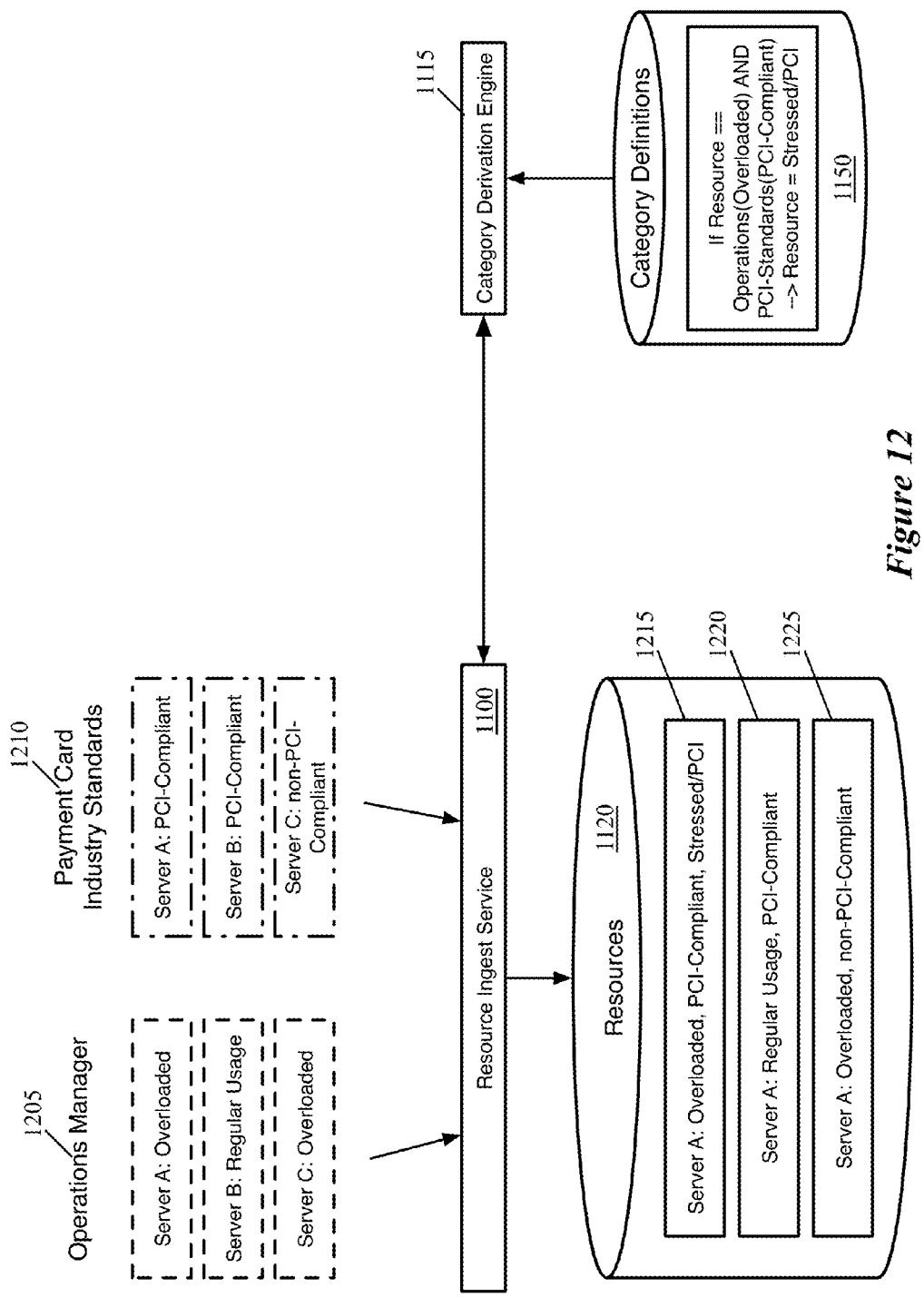
FIG. 12 conceptually illustrates another example of the resource ingest service of FIG. 11 using the category derivation engine to generate additional categories for resources ingested from two different sources.

FIG. 12 conceptually illustrates another example of the resource ingest service 1100 using the category derivation engine 1115 to generate additional categories for resources ingested from two different sources. In this case, the sources are an operations manager 1205 that monitors server usage (among other things) and payment card industry (PCI)

standards compliance information 1210. The PCI standards information may be a separate database or integrated into a computing resource manager that performs other monitoring and management functionality as well.

As shown, the resource ingest service 1100 receives resource information in a first format from the operations manager 1205 and in a second format from the PCI standards compliance information 1210. The operations manager 1205 indicates that Servers A and C are overloaded while Server B has regular usage. The PCI standards compliance info 1210 indicates that Servers A and B are PCI-compliant, while Server C is not PCI compliant. Although these sets of records are received from two different sources, because they identify the same servers (e.g., using the same UID) the resource ingest service can consolidate the information into three records 1215-1225.

While the previous figure showed an example of multiple category tags from different sources indicating the same real-world category, in some cases the computing environment administrator will want to use derived categories that indicate the intersection of orthogonal categories. In this example, it may be useful to know which PCI-compliant servers are overloaded in case specific policies need to be applied to these resources (e.g., so that the compute manager can take actions to remove some of their load). As such, the derived category rules storage 1150 shows (again in pseudo-code) a rule that if the operation manager indicates that a server is overloaded and the server is PCI-compliant, the server will be tagged as "Stressed/PCI" to indicate this combination. Policies can then be bound to the servers tagged as such, without the need to write both categories into multiple separate binding rules. While shown in this example as an intersection of two categories, some embodiments may use much more complex tag grouping, with combinations of Boolean logic (e.g., all PCI-compliant servers that are underutilized in a particular datacenter (with multiple different inputs that could indicate the particular datacenter, as in the previous figure)).

III. Compiling Policy Bindings

Once the policies and the resource information is stored by the policy framework, the policies (both primitive policies and composite policies) can then be applied to the resources based on a set of binding rules that are stored with the policies. These binding rules may be defined by the user of the policy framework (e.g., a datacenter administrator) or may be built-in to the framework. In some embodiments, each binding rule specifies, for a policy or set of policies, one or more categories of resources to which the policies will be bound. For instance, a policy might be bound to all VMs in a particular datacenter, all servers that host a particular type of VM, etc. The binding rules may specify bindings of primitive policies or composite policies.

A compiler of the policy unification framework of some embodiments uses the binding rules to generate, for each resource for which information is stored by the system, a set of effective policies to apply to the resource. This compilation process flattens the composite policies that are applied to the resource, such that the effective policies specify all of the primitive policies to apply to the resource. These effective policies can then be consumed by various policy engines (which may be the same as the sources that provided some of the policies and/or resource descriptions in the first place). In addition, some embodiments allow for the inclusion of specific exceptions to policy binding rules (i.e., to not apply policy X to resource A), so long as adequate explanations are documented for those exceptions. This allows the datacenter administrator to primarily use the binding rules to easily apply policies to large classes of resources and only provide specifics for the exceptions, rather than the administrator needing to specify to apply the policy to each separate resource in the category.

In some embodiments, as mentioned, the policies are wrapped in a normalization wrapper in order for policies from a variety of heterogeneous sources to be treated in the same manner by the policy framework, and easily composed into composite policies and applied to resources. The composition language used for this normalization wrapper allows for the compiler 315 to easily determine how to flatten a composite policy, as it need only read the information in the normalization wrapper, and does not need to delve into the specific content of the policy.

Furthermore, as will be described in more detail in Section IV below, when computing the effective policies, the compiler of some embodiments identifies parameters to map from the composite policies to the applied primitives contained by those composite policies (or queries a specified source or the user for the parameter values), evaluates any functions or conditional operations specified in the composite policy wrapper, etc., so that the effective policies are complete useable policies.

Figure 13:
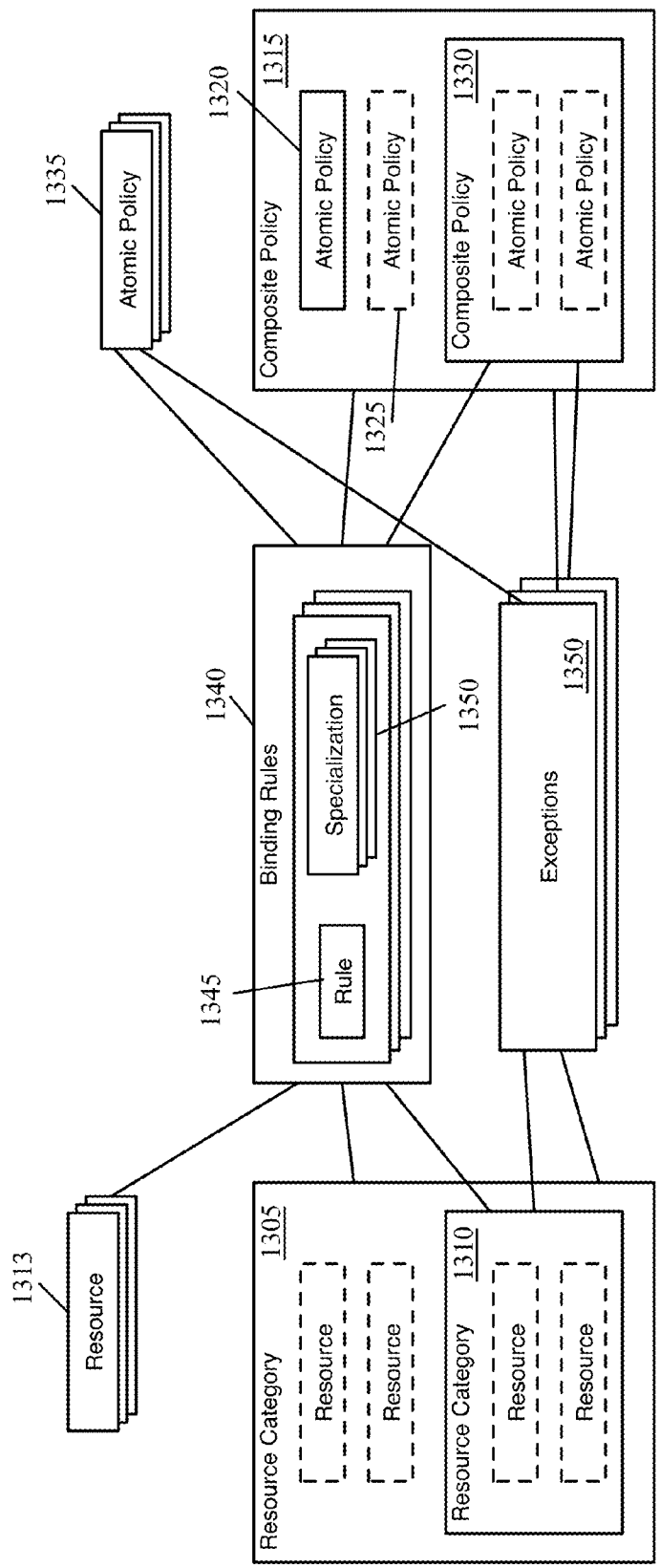
FIG. 13 conceptually illustrates the links within the policy unification framework between policies and resources, as provided by binding rules and exceptions to those rules.

FIG. 13 conceptually illustrates the links within the policy unification framework between policies and resources, as provided by binding rules and exceptions to those rules. As illustrated conceptually by this figure, the binding rules may be used to bind both atomic and composite policies to individual resources and to categories of resources. In addition, the binding rules may include various specializations, which allow the administrator to modify how a particular policy is applied to a particular resource or category of resources (e.g., imposing certain parameters on the policy for the category). In addition, the figure illustrates that exceptions may be defined to exempt certain resources or sub-categories of resources from the application of one or more policies.

As shown, the figure illustrates a first resource category 1305 that contains a second resource category 1310, as well as a set of individual resources 1313. The resources 1313 could be separate resources, or the resources contained in the first category 1305 or the sub-category 1310. Both of the categories 1305 and 1310 contain resources; however, these resources are shown using dashed lines as they are tagged as part of the categories, but also exist as individual resources that can be bound to policies either individually or based on other categories to which the resources belong. In this example, the first category 1305 contains all resources that are part of a second category 1310, as well as additional resources. For instance, the first category 1305 might be all VMs in a datacenter, while the second category 1310 is a derived category that includes all VMs in the datacenter that run a particular operating system (or meet some other additional criteria).

Whereas the resource categories 1305 and 1310 are based on tags in some embodiments, such that each resource also exists outside of the category (and can be bound to policies based on other category tags, etc.), the policies may include inline atomic policies that only exist within the composite policy in which the atomic policy is defined. As shown, the figure illustrates a first composite policy 1315 that contains an inline atomic policy 1320, a referenced atomic policy 1325, and a second composite policy 1330. The inline atomic policy 1320 is a policy definition contained within the composite policy 1315, while the atomic policy 1325 and the composite policy 1330 are referenced by the composite policy 1305, but also exist separately (and can thus be bound separately to resources). Whereas the resource category 1310 is defined to be a sub-category of the resource category 1305 based on the properties of the resources, the composite policy 1330 could also exist separately, be referenced by other composite policies, and have its reference in the first composite policy 1315 removed. In addition to these composite policies, the atomic policies 1335 also exist on their own and can be separately bound to resources via the binding rules.

As mentioned, the binding rules 1340 are used by the compiler of the policy unification framework of some embodiments to bind policies to resources. The lines drawn from the resources to the binding rules show that the various resource categories 1305 and 1310 can be bound to policies through the binding rules, as can the individual resources 1313. Binding the category 1305 to a particular policy or group of policies effectively means that each resource that belongs to the category will be bound to each policy specified by the binding rule. When a binding rule specifies that one of the individual resources 1313 is bound to a policy or group of policies, only that resource is affected by the rule.

When a binding rule 1340 specifies that an atomic policy 1325 is bound to a resource or category of resources, the compiler binds that atomic policy to each resource tagged with the particular category (or the individual resource). In addition, as shown, the composite policies 1315 and 1330 can be bound to the resources. A rule that binds the composite policy 1315 to a particular category of resources effectively binds the inline atomic policy 1320, referenced atomic policy 1325, as well as all atomic policies of the referenced composite 1330 to the specified resources. On the other hand, a rule binding the composite policy 1330 only binds its referenced atomic policies to the specified resources.

Each of the binding rules 1340 has at least a rule 1345, and possibly one or more specializations 1350. The rules 1345 specify the actual bind between resources (e.g., by category) and policy or policies. The specializations 1350, in some embodiments, allow the administrator to put special handling into the binding rules, in order to tailor the specifics of the policies to the requirements of the resources. For example, if an atomic policy listed six rules, but the administrator only wanted five of those six rules to apply to resources in a particular category, the binding rule for that category could specify to modify the policy content in such a way that the sixth rule did not apply. In complex systems, this can prevent policy explosion (i.e., from having to create new policies for every minor change in how the policy will be applied. In some embodiments, some types of specializations are conceptually part of the binding rules because they are handled by the compiler, but are actually written into the policy wrapper (e.g., as parameters that are filled in, conditional statements, etc.).

In addition to the binding rules, the policy unification framework of some embodiments allows for exceptions 1355. These exceptions 1355 allow for a binding of a policy to a particular resource or group of resources to be negated. As an example, the administrator might want the policies referenced by composite policy 1315 to apply to the resources in the category 1310, except for the atomic policy 1325 to one of the individual resources in that category. The administrator could then define an exception stating that the policy 1325 should not apply to the particular resource. The compiler of some embodiments would create the binding, but effectively negate the binding such that the policy engines would not apply the policy. In some embodiments, any exceptions require the creator to document a reason for the exception, so that the exception can be tracked and understood at a later time (e.g., in case of an audit of the system).

Figure 14:
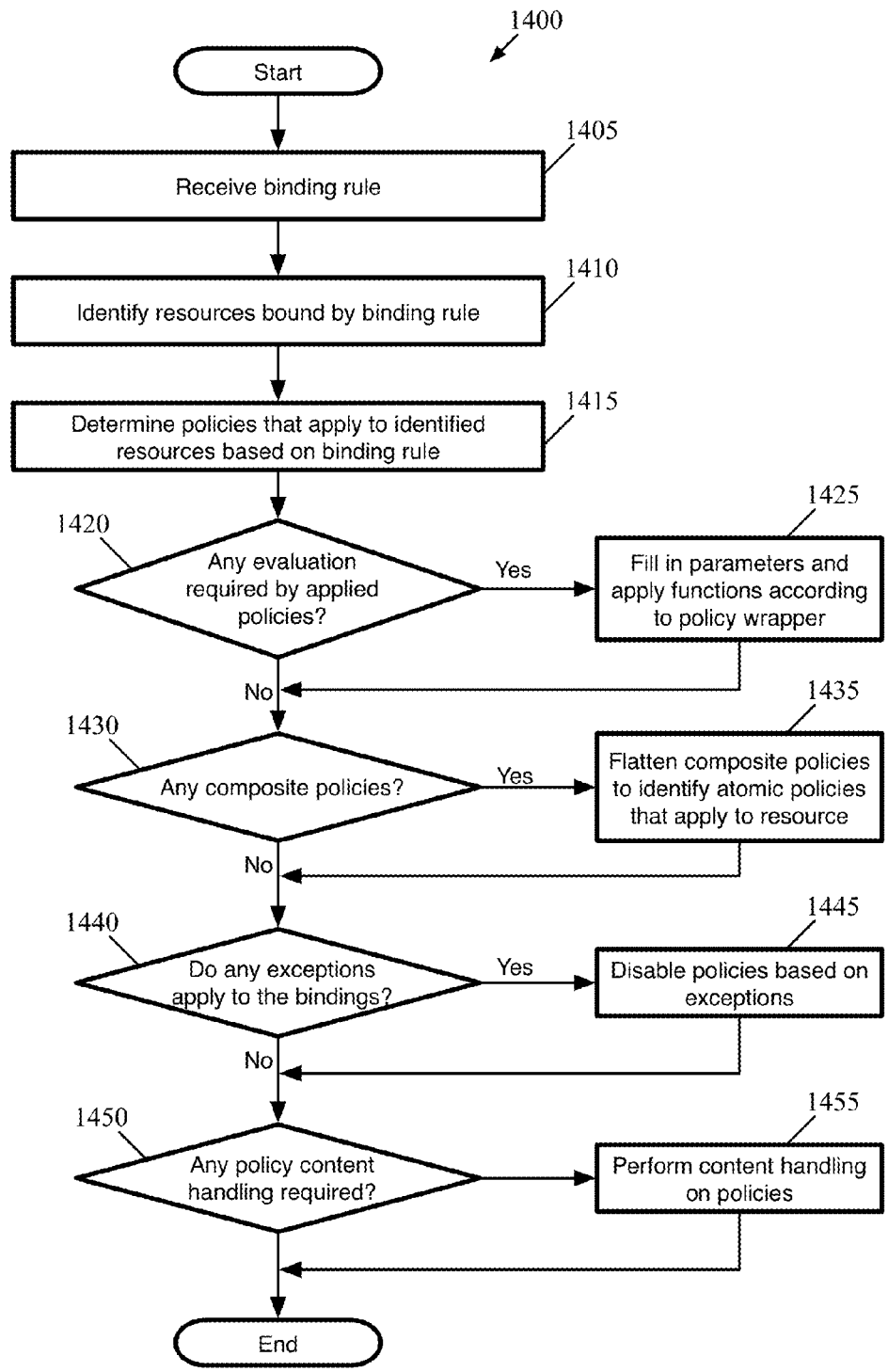
FIG. 14 conceptually illustrates a process performed by the compiler of some embodiments to perform the binding of policies to resources.

While FIG. 13 conceptually illustrates the structure of the bindings used by the compiler to generate effective policies for the resources in a computing environment, FIG. 14 conceptually illustrates a process 1400 performed by the compiler of some embodiments (e.g., the compiler 315) to perform this binding of policies to resources. This process 1400 illustrates the policies bound on a per-binding rule basis. However, it should be understood that the compilers of different embodiments may bind policies on a per-category basis, a per-resource basis, or a per-policy basis, depending on how the code is written for the compiler, so long as the end result is that all of the policy bindings are evaluated.

As shown, the process 1400 begins by receiving (at 1405) a binding rule. In some embodiments, though not shown in this figure, the compiler loops over the set of binding rules when compiling all of the policies for the policy framework. As mentioned by reference to FIG. 13, each binding rule includes at least a rule that binds one or more policies to one or more resources or categories of resources (it is possible that no resources are bound, if there are no resources in the system tagged with the bound category).

The process then identifies (at 1410) the resources bound by the binding rule. As described in detail in Section II, resources may be tagged as belonging to multiple categories, with the categories both received from one or more sources of information about the resource as well as derived based on these received categories. A binding rule specifies one or more of these categories, and binds policies to the resources that belong to the category. Thus, for each category specified by the binding rule, the compiler identifies all of the resources tagged as belonging to the category. If a resource belongs to multiple categories to which a policy is bound by a rule, the compiler removes these duplicates in some embodiments (i.e., the policies need only be bound once). However, both category tags may be used to apply exceptions, fill in parameters, etc. if needed.

The process also determines (at 1415) the policies that apply to the identified resources based on the current binding rule. In some cases, the binding rule identifies a specific atomic policy or a single composite policy that is to be applied to each of the resources (identifying the policy by, e.g., namespace, name, and version). Other binding rules may identify several policies, including atomic and/or composite policies.

The process then determines (at 1420) whether any evaluation is required by the applied policies. Specifically, policies may require parameters to be filled into policies, or for functions and conditional statements to be evaluated during compilation. For instance, a composite policy might refer to an atomic policy and provide parameters for that atomic policy. The parameter values are not included with the atomic policy definition because other references to the atomic policy could include different parameter values. At compilation time, the compiler fills in these parameters to the atomic policy so that the atomic policy is complete. Similarly, the parameter values might be determined by functions (based on other parameters, resource factors, etc.), which the compiler evaluates in order to come up with a value for the parameter. In addition, some policies include conditional statements that apply one referenced policy or the other depending on a parameter value, an aspect of a resource to which the policy is applied, etc. When the policies applied by the binding rule require this type of evaluation, the process 1400 fills in (at 1425) parameter, and applies functions and conditional evaluations as necessary according to the information in the policy wrapper. These operations will be described in more detail in the following section IV.

The process 1400 also determines (at 1430) whether the policies applied by the binding rule include any composite policies. If so, the process flattens (at 1435) the composite policies to identify all of the atomic policies applied to each of the resources by the binding rule. That is, for a composite policy applied to a resource by the binding rule, the compiler identifies each atomic policy (either inline or referenced) contained within the composite policy and binds this to the resource. An atomic policy may be directly referenced by the composite policy, or could be referenced by a nested composite policy that is in turn referenced by the composite policy specified in the binding rule. The output of the compiler, in some embodiments, is a set of effective policies that are applied to each resource. Each such effective policy is an atomic policy that is bound to the resource and has had all of its parameters filled in, functions evaluated, etc. That is, each effective policy as bound to a resource could be published to its policy engine(s), which monitors the computing environment and enforces the policy, without requiring the policy engine to evaluate any of the policy composition language. Instead, the policy engine need only read the actual policy content contained within the content field of the policy normalization wrapper.

Next, the process 1400 determines (at 1405) whether any exceptions apply to the policy-resource bindings generated by the compiler. As described above, exceptions allow for a binding of a policy to a particular resource or group of resources to be negated. For instance, the administrator of a computing environment might want a specific atomic policy contained within a composite policy to not apply to one resource in a category to which the composite policy is otherwise bound. In this case, the administrator would define an exception for the resource and specific atomic policy. Similarly, categories or sub-categories of resources could have exceptions to atomic or composite policies (though as the exceptions get larger, it may be preferred in some embodiments to instead refine the binding rules). In some embodiments, any exceptions require the creator to document a reason for the exception, so that the exception can be tracked and understood at a later time (e.g., in case of an audit of the system). If any exceptions apply to the bindings, the process disables (at 1445) the effective policies as bound to a particular resource or resources based on the specified exception. In some embodiments, the policy is disabled via the compiler annotating either the effective policy or the resource with a flag that specifies to not apply the effective policy to the resource.

Lastly, the process 1400 determines (at 1450) whether any of the policies require handling of the policy content to generate the effective content. Specifically, the parameter values may need to be automatically edited into the policy content, and potentially other operations may be applied to the policy content as well. For example, some embodiments use symbolic substitution to edit the parameter values into the policy content. That is, an atomic policy that exposes a parameter "dst_IP" might receive as a value 192.168.0.4. While the compilation process would associate this value with the parameter in the policy wrapper, some embodiments use a special policy content handler to actually write the parameter into the content itself so that the content can then be consumed by a policy engine.

Some embodiments use a symbolic substitution handler that identifies the string in the policy content for each parameter and substitutes the parameter value. Thus, in the previous example, the phrase "drop packets sent to dst_IP" would be modified to read "drop packets sent to 192.168.0.4". In addition, some embodiments allow for other types of policy content handlers to be used during the compilation process. These policy handlers, for example, could provide processing required for policies written in a particular policy language, or could translate a policy language written in a higher-level language into instances in a lower-level language (which would be consumed by one or more of the policy engines).

As an example of specific processing, the administrator might choose to use code written in a programming language (e.g., Javascript, C, etc.) to perform the functions, lookups, mappings, etc. that would otherwise be performed within the normalization wrapper. In this case, the administrator could write this code as a policy content handler, and just use the policy composition language to pass parameter values. As an example of translation, such a translation algorithm might translate pseudocode written in a simple language that uses commonly-understood terminology into a more abstract rule language or XML schema that can be read by the policy engines, or a domain-specific language into a standards based language. In some embodiments, the policy unification framework is provided with the symbolic substitution handler, but with the ability for the administrator to add any other handlers (i.e., as an extensibility point in the framework). If any such policy content handling is required, the process performs (at 1455) the content handling (e.g., by handing the policies off to the appropriate handlers. The process 1400 then ends.

The compiler of some embodiments may also perform additional actions on the effective policies in some embodiments. For example, some embodiments include intelligence to handle when the same atomic policy is applied several times to a single resource as the result of multiple binding rules applying to the resource. In some cases, if no parameters are exposed by the atomic policy, or if all exposed parameters have the same value, then only one of the effective policies is required, as all of the effective policies will be exactly the same. When the parameters are different, some embodiments may attempt to merge the effective policies, when possible. For instance, if one effective policy allows packets on ports 1-80 and another packet allows packets on ports 81-160 (with all other properties the same), then these can be merged into a single policy allowing packets on ports 1-160.

On the other hand, in some cases, the policies cannot or should not be merged. For example, if a first instance of an atomic policy applied to a particular resource defines a maximum VM storage size as 4 GB while a second instance of the same atomic policy defines the maximum VM storage size as 8 GB, these cannot be merged. Instead, some embodiments select one of the effective policies and remove the other based on either an explicit rule, intelligence that selects either the larger or smaller policy instance, etc.

Figure 15:
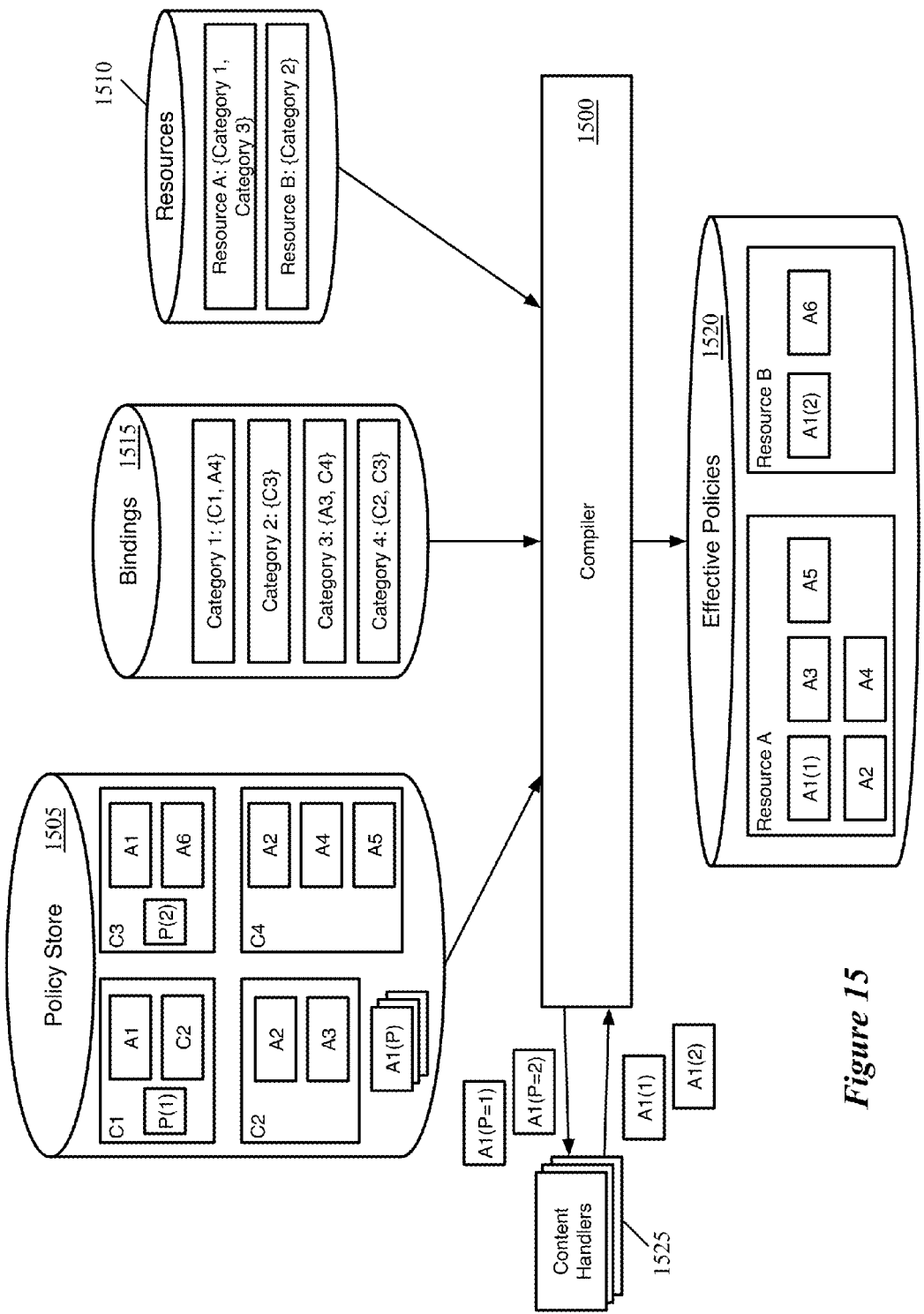
FIG. 15 illustrates an example of the policy bindings resulting from an input set of policies, resource definitions, and binding rules.

FIG. 15 illustrates an example of the policy bindings resulting from an input set of policies 1505, resource definitions 1510, and binding rules 1515. This information is evaluated by a compiler 1500 in order to identify a set of effective policies for each of the resources in the resource definitions store 1510. In addition, the compiler 1500 uses a set of content handlers 1525 to perform any required editing of the policy content (i.e., the policy as written in policy language).

As shown, the system includes two resources, Resource A and Resource B. Resource A belongs to category 1 and category 3, while Resource B belongs to category 2. The policies, meanwhile, include four composite policies C1-C4. The first composite policy C1 includes references to an atomic policy A1 and the second composite policy C2, which in turn refers to two atomic policies A2 and A3. In addition, the first composite policy C1 includes a parameter value of 1 defined for the atomic policy A1, which exposes a parameter P. The third composite policy C3 includes references to atomic policies A2 and A6, while the fourth composite policy C4 includes references to the atomic policies A1, A4, and A5.

Lastly, the inputs also include the binding rules 1515. As shown, there are four binding rules shown, each of which binds a category to one or more policies. These rules bind policies C1 and A4 to category 1, policy C3 to category 2, policies A3 and C4 to category 3, and policies C2 and C3 to category 4. The compiler 1500 evaluates each of these binding rules to identify the effective policies 1520 that apply to each of the resources in the system.

The output of the compiler is a set of effective policies for each resource in the system. In this case, the Resource A belongs to category 1, and therefore composite policy C1 and atomic policy A4 apply. Composite policy C1 includes atomic policy A1 and composite policy C2, which includes references to atomic policies A2 and A3. Thus, based on its inclusion in category 1, Resource A has atomic policies A1, A2, A3, and A4 applied. The atomic policy A1 is filled in with the parameter value 1, because it is applied through the composite policy C1. In addition, Resource A belongs to category 3, and therefore is also bound to atomic policy A3 and composite policy C4 through this category. The atomic policy A3 is a duplicate (i.e., it is already bound to Resource A via the binding rule for category 1), as are atomic policies A2 and A4 of the composite policy C4. This composite policy also includes a reference to atomic policy A5, so that this policy is bound to Resource A as well. Thus, atomic policies A1, A2, A3, A4, and A5 are all applied to the first resource.

Resource B belongs to category 2, and therefore only composite policy C3 applies. This composite policy includes references to A1 (with a different parameter value 2) and A6, with no additional nesting of policies. Thus, only these two policies A1 and A6 are the effective policies applied to Resource B, with policy A1 as applied having a parameter value 2.

As shown, during the compilation process, the compiler 1500 passes the two instances of atomic policy A1 to one of the content handlers 1525. In this case, the content handler 1525 performs symbolic substitution on the two instances of policy A1. Specifically, for the policy instance bound to Resource A, the content handler 1525 substitutes the value 1 into the policy content for the parameter P, whereas for the policy instance bound to Resource B, the content handler substitutes the value 2 into the policy content for the parameter P.

IV. Policy Composition Details

As mentioned above, the policy unification framework of some embodiments provides a composition language that allows content developers for the framework (either the providers of the framework, computing environment administrators, and/or third party developers) to not only easily compose groups of policies, but also to provide for policy differentiation via parameterization, enable the use of functions for calculating parameters, allow conditional policy references, etc. This section provides various examples of policy composition according to some embodiments in FIGS. 16-20.

Figure 16:
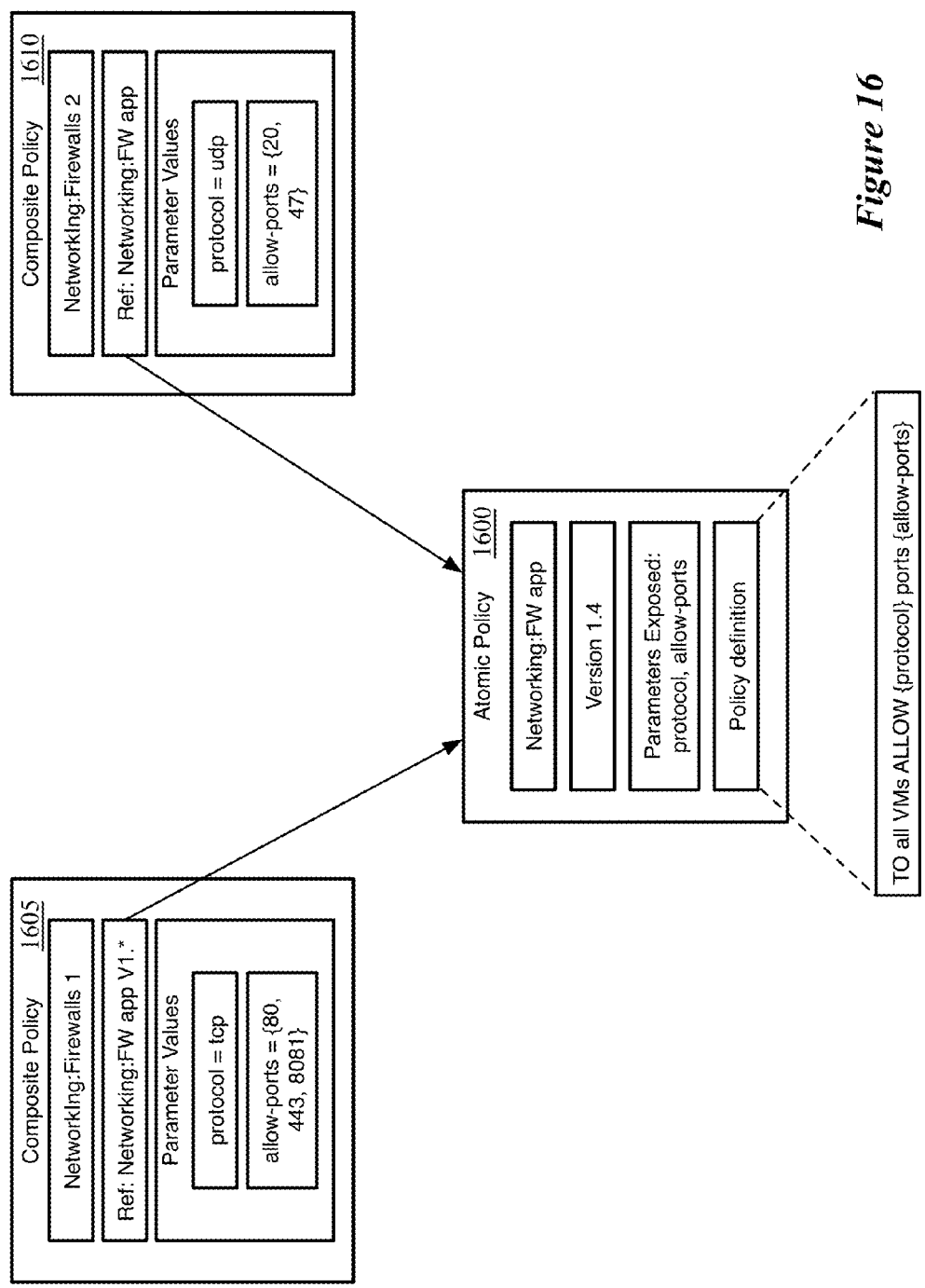
FIG. 16 conceptually illustrates an example of two composite policies that refer to an atomic policy using different parameters.

FIG. 16 conceptually illustrates an example of two composite policies 1605 and 1610 that refer to an atomic policy 1600 using different parameters. In this case, both of the composite policies 1605 and 1610 only refer to the one atomic policy 1600, and do not contain additional policies (either inline policies or additional references). However, it should be understood that composite policies such as those shown in this figure could contain additional policy references (or inline policy definitions).

The atomic policy 1600, as illustrated, includes a namespace ("Networking") and name ("FW app"), as well as a version number ("1.4"). In this and subsequent figures, the namespace and name fields are shown as "namespace: name". In addition, the atomic policy 1600 includes a policy definition for a firewall rule, with two parameters that are customizable for each reference to the atomic policy 1600. Specifically, the firewall rule specifies to allow packets sent to all VMs governed by the policy when the layer 4 protocol matches the protocol parameter and the destination port matches one of the ports in the allow-ports parameter. Thus, this atomic policy 1600 exposes two parameters that are needed for a complete effective policy. As shown, these parameters are exposed as part of the policy wrapper in some embodiments. Some embodiments also provide details on the type of value that each parameter takes (e.g., string, integer, floating-point decimal, etc.) and/or a list of allowable values (e.g., 0-65535 for the layer 4 ports).

Each of the two composite policies 1605 and 1610 provides different values for these parameters. The first composite policy 1605 has a namespace and name of "Networking:Firewalls 1", and includes a reference to the atomic policy 1600. This reference specifies the version as version "1.*", which in some embodiments refers to the newest version that starts with a 1. Thus, if a version 1.5 of the atomic policy 1600 was input to the system, the composite policy 1605 would automatically refer to that version; however, if a version 2.0 was input to the system, the composite policy 1605 would continue to refer to the policy 1600. In addition, the composite policy 1605 specifies values for the two parameters of the atomic policy 1600, namely that the protocol field is "tcp" and that the allow-ports field is the set {80, 443, 8081}. Thus, when compiled, the effective firewall policy as applied to one or more resources specifies to allow all TCP packets on ports 80, 443, and 8081.

The second composite policy 1610, on the other hand, has a namespace and name of "Networking:Firewalls 2", and also includes a reference to the atomic policy 1600. This reference does not specify a version, which in some embodiments means that it will always refer to the latest version of the policy "Networking:FW app". The policy 1610 specifies that the protocol field is "udp" and the allow-ports field is the set {20, 47}. Thus, when compiled, the effective firewall policy as applied to the resources to which the policy 1605 is bound specifies to allow all UDP packets on ports 20 and 47. Thus, only the single atomic policy 1600 need be defined, and the parameterization allows for the administrator to define various different firewall policies without a need to understand the language in which the policies are actually written so long as the parameters are exposed by the atomic policy.

Figure 17:
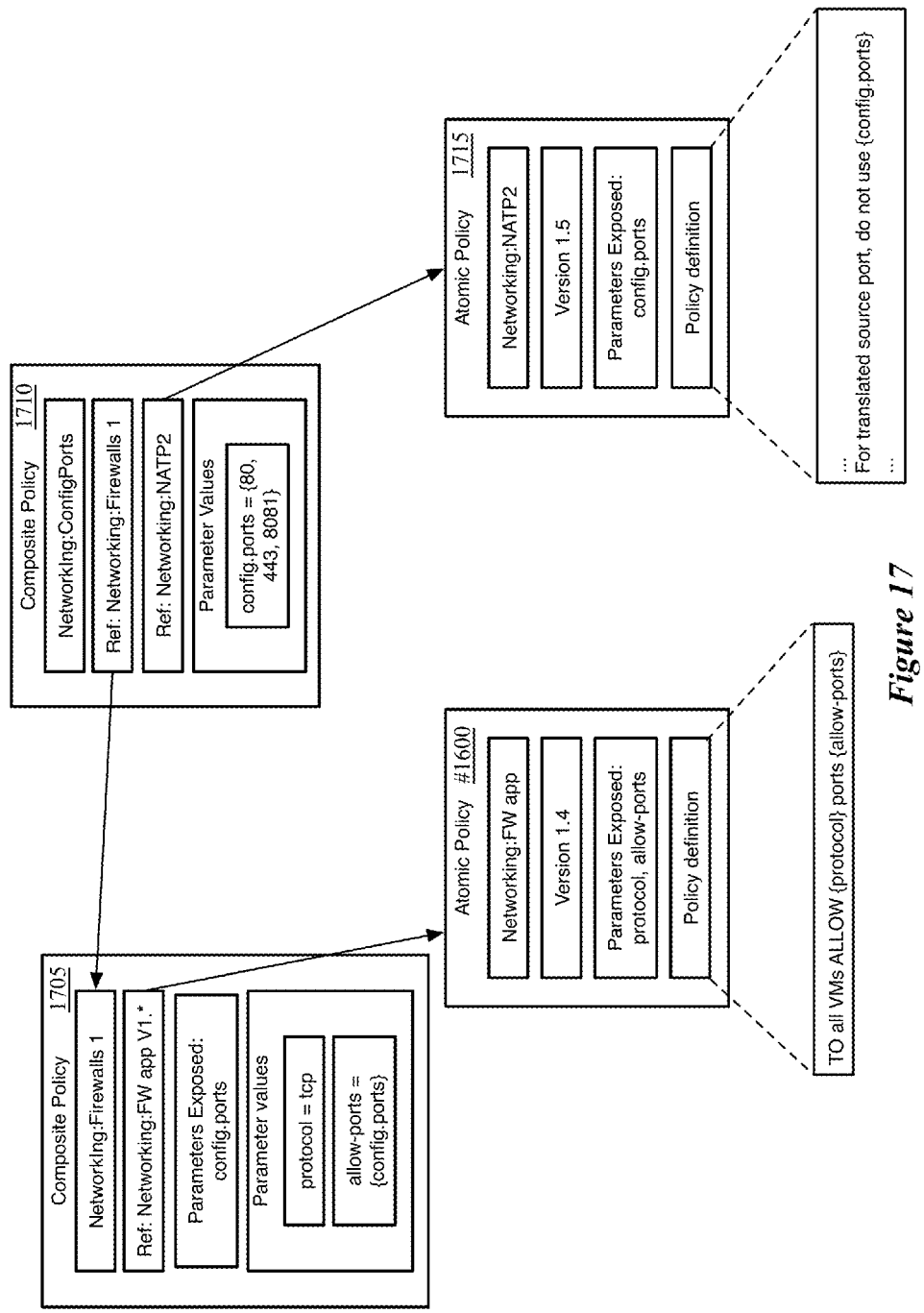
FIG. 17 illustrates the mapping of a parameter through multiple levels of references to the atomic policy.

FIG. 17 illustrates the mapping of a parameter through multiple levels of references to the atomic policy 1600. Specifically, a first composite policy 1705 having the name "Networking:Firewalls 1" references the atomic policy 1600 in a similar manner to the references shown in the previous figure. In this case, while the protocol field specifies "tcp" as the parameter value, the allow-ports field parameter value is a reference "config.ports". In this manner, the parameter passed by the policy 1705 requires the compiler to look elsewhere for the parameter value. This might require the evaluation of a function (shown below in FIG. 18), a reference to an aspect of the resource to which the policy is being applied, or in this case a parameter exposed by the composite policy 1705 and passed through another policy reference to that composite policy. Specifically, the composite policy 1705 exposes a parameter (config.ports) that is then used as one of the parameter values passed to a referenced atomic policy.

A second composite policy 1710, having the name "Networking:ConfigPorts" refers to the first composite policy 1705, as well as a different atomic policy 1715. The composite policy 1710 includes a set of values for the parameter "config.ports", with the set including ports 80, 443, and 8081. This parameter is used not only by the composite policy 1705 to complete the definition of the FW app policy 1600, but also by the atomic policy 1715, which requires a set of ports for its policy definition as well. In this case, the atomic policy 1715 ("Networking" NATP2") specifies to not use these ports for the translated source port (presumably when performing network address and port translation). As such, the effective policies applied to one or more resources based on a rule that binds the policy 1710 to the resources will have a firewall rule to allow tcp packets on ports 80, 443, and 8081, as well as to not use ports 80, 443, and 8081 for the translated source port when NAT is performed.

Figure 18:
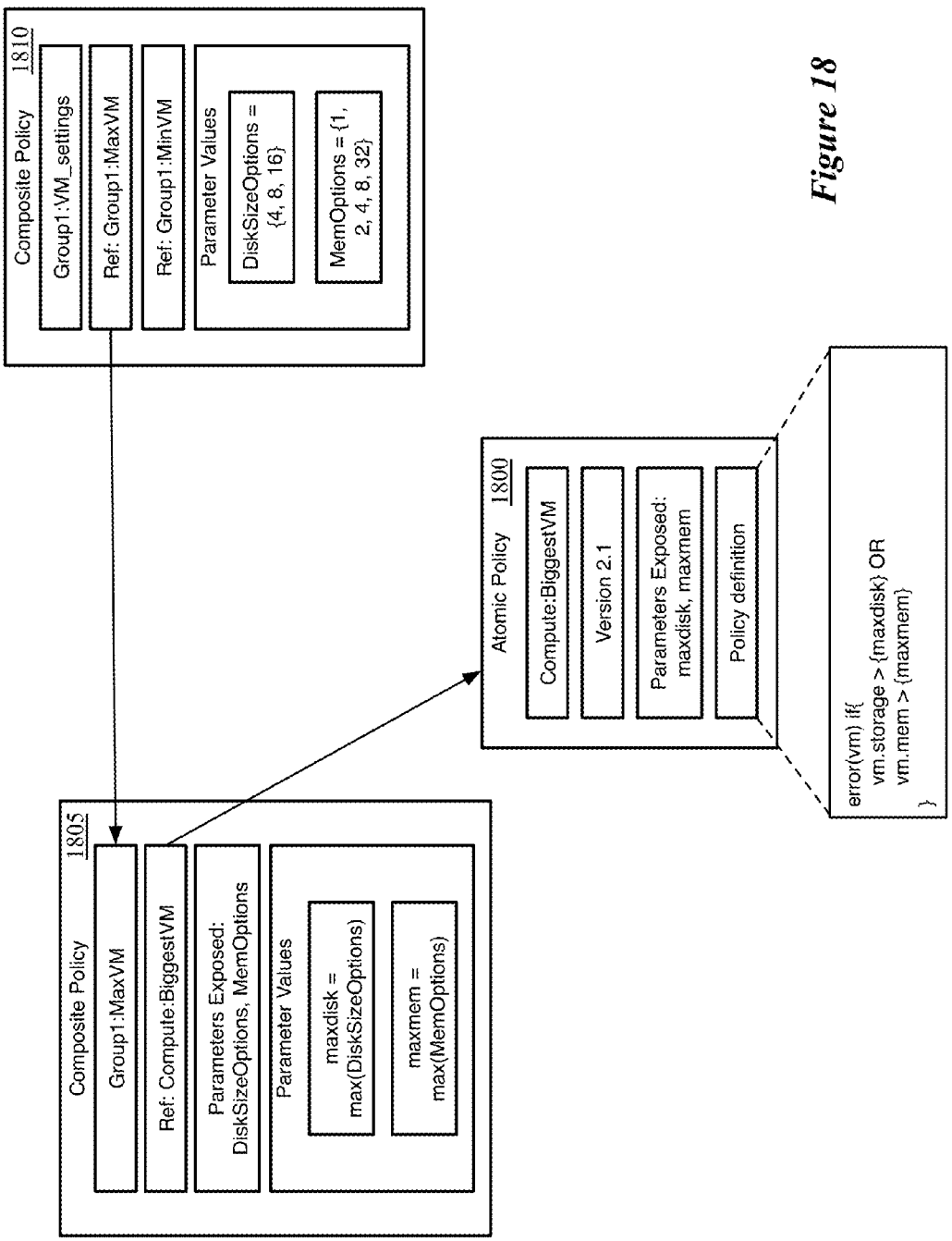
FIG. 18 illustrates an example of using functions to complete an atomic policy during compilation.

As mentioned, some embodiments use functions to compute values for parameters. FIG. 18 illustrates an example of using such functions to complete an atomic policy 1800 during compilation. As shown in the figure, the atomic policy 1800 has a name and namespace of "Compute: BiggestVM", and includes a policy content definition that states that a VM is in error if either its storage exceeds a parameter "maxdisk" or if its memory exceeds a parameter "maxmem", two parameters exposed by the policy 1800. Such a policy could be used by a compute manager or other monitoring system to ensure that VMs stay within a specified size and report (or automatically correct) when VMs violate the policy.

The atomic policy 1800 is referred to by a composite policy 1805 with a namespace and name of "Group1: MaxVM". In some embodiments, multiple different groups (e.g., tenants, sub-organizations within an enterprise, etc.) that have networks (e.g., logical networks) within a computing environment may utilize the same policies, with the parameters allowing the different groups to customize the policies to their respective needs (or a datacenter administrator to customize the policies for different groups). The composite policy 1805 defines values for the parameters maxdisk and maxmem using functions. Specifically, both of the parameters are calculated using the max function, which takes as inputs one or more values and outputs the maximum of those values. The maxdisk parameter is calculated as the maximum of the set "DiskSizeOptions", while the maxmem parameter is calculated as the maximum of the set "MemOptions". These two sets are exposed as parameters by the composite policy 1805.

These sets ("DiskSizeOptions" and "MemOptions") are provided via a second composite policy 1810 called ("Group1:VM_settings") that refers to the "Group1: MaxVM" policy 1805 as well as another composite policy called "Group1:MinVM" (not shown in the figure). This composite policy 1810 defines the parameter DiskSizeOptions as having the values {4, 8, 16}, and the parameter MemOptions as having the values {1, 2, 48, 8, 32}. Thus, Group 1 VMs are allowed to have 4, 8, or 16 GB of disk space, and 1, 2, 4, 8, or 32 GB of RAM. The result of compiling these policies, when the Group1:VM_settings policy is bound to a particular resource, is that the atomic policy 1800 is defined to specify that a VM is in violation if its storage space is greater than 16 GB or if its allocated memory is greater than 32 GB.

Figure 19:
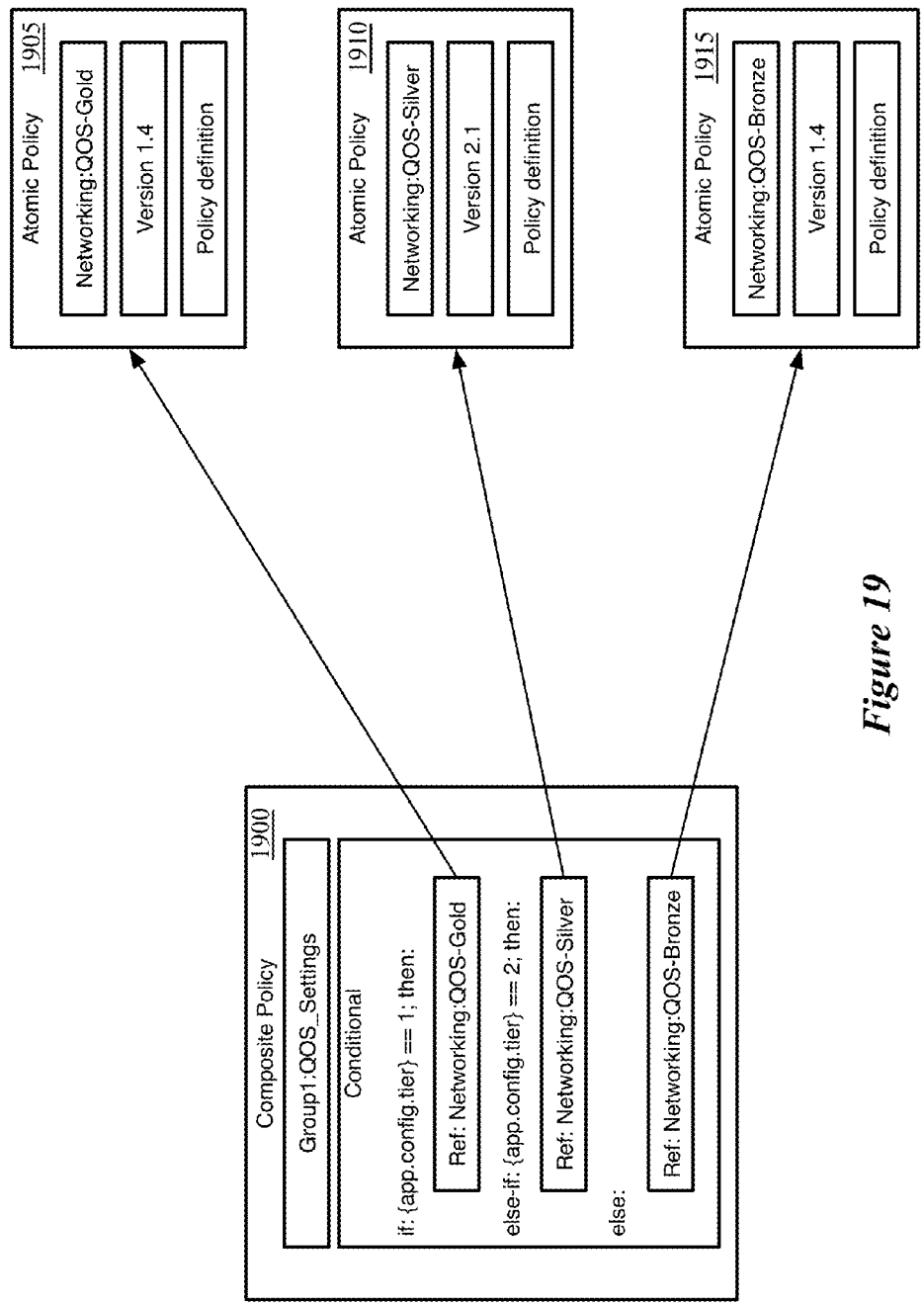
FIG. 19 illustrates the use of references to three different policies depending on the value of a parameter.
Figure 20:
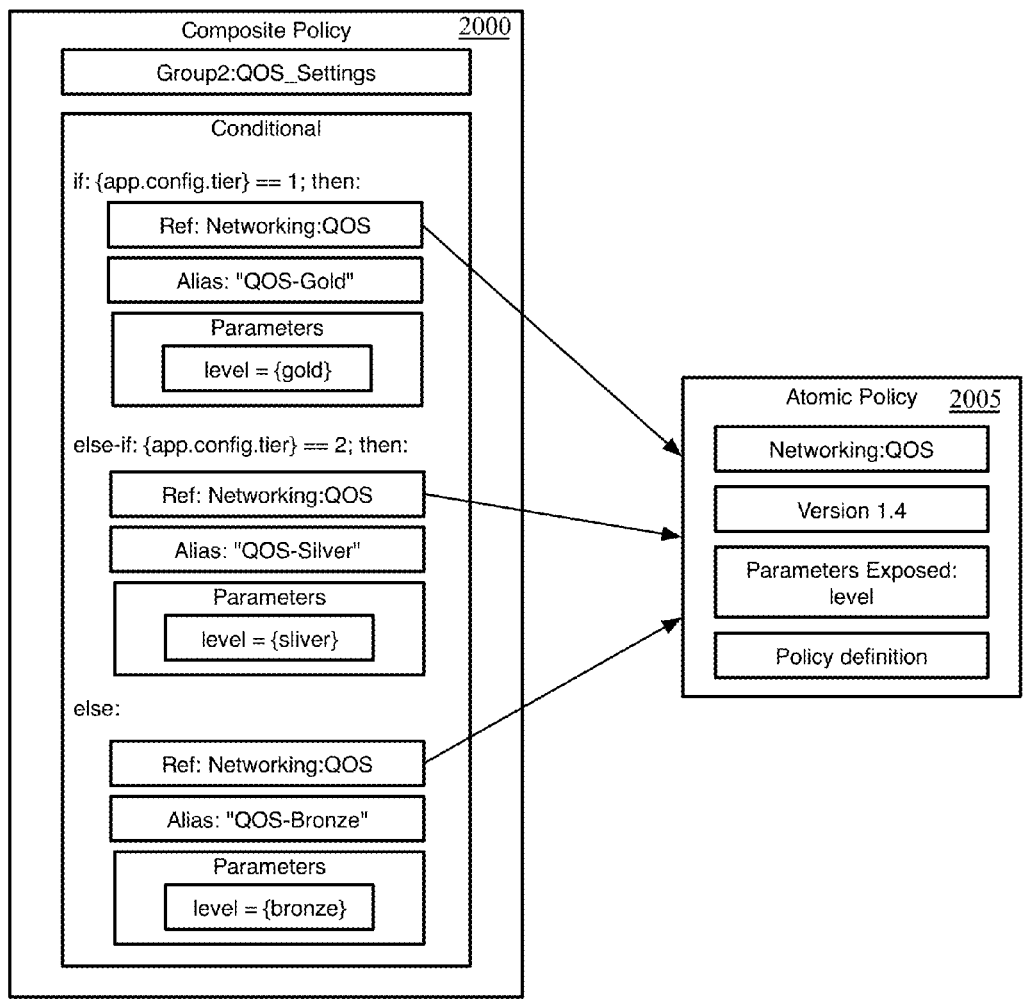
FIG. 20 illustrates a composite policy with three different conditional references to the same atomic policy.

While FIGS. 16-18 illustrate different ways in which parameter values can be set during compilation using the policy composition language of some embodiments, FIGS. 19 and 20 conceptually illustrate the use of conditional policy references in two different manners. Specifically, FIG. 19 illustrates the use of references to three different policies depending on the value of a parameter. This figure shows a composite policy 1900 having a namespace and name of "Group1:QOS_Settings", and containing three references to different atomic policies 1905-1915 inside a set of conditional statements.

The references depend on the value of the parameter app.config.tier. As an example, the parameter app.config.tier could be a parameter determined by the resource (e.g., a VM, an application) to which the policy 1900 is applied. That is, the resource has a value of 1, 2, 3, etc. for the app.config.tier parameter, which is used to determine which atomic policy will be applied to the resource. In some embodiments, the app.config.tier is a category to which the resource belongs that is either ingested from a resource information provider or derived based on such ingested information. For instance, a binding rule could apply the policy 1900 to all resources of the category application, while using the other categories (app.config.tier==1, app-.config.tier==2, etc.) as a differentiator within the applied policy.

As shown, if the parameter app.config.tier has a value of 1, then the policy 1900 (as applied to the resource) refers to the atomic policy 1905 (named "Networking:QOS-Gold"), which provides a policy outlining the highest quality of service for the resource to which it is applied. The effective policy applied to that resource will just be the atomic policy 1905. If the parameter app.config.tier has a value of 2, then the policy 1900 (as applied to the resource) refers to the atomic policy 1910 (named "Networking:QOS-Silver"), which provides a policy outlining a medium-tier quality of service for the resource to which it is applied. The effective policy applied to such a resource would be the atomic policy 1910. On the other hand, if the app.config.tier parameter has a different value (or no value at all), then the policy 1900 as applied to a resource refers to the atomic policy 1915 (named "Network:QOS-Bronze"), which provides a policy outlining the lowest-tier quality of service for the resource to which it is applied. The effective policy applied to such a resource would be the atomic policy 1915. Thus, the conditional statement within a composite policy allows the policy to refer to different atomic policies (or other composite policies), depending on the value of a parameter passed from another policy reference, computed using a function, determined based on a characteristic of the resource to which it is applied, etc.

FIG. 20, on the other hand, illustrates a composite policy 2000 with three different conditional references to the same atomic policy 2005. The composite policy 2000 has the namespace and name "Group2:QOS_Settings", and includes a similar set of conditional statements to that of the composite policy 1900. As in the previous example, the references depend on the value of a parameter app.config.tier, which could be a property of the resource to which the policy is applied, a value set by a policy that refers to the policy 2000, etc.

As shown, if the parameter app.config.tier has a value of 1 for a particular resource, then the policy 2000 as applied to the resource refers to the atomic policy 2005, and passes a level parameter with the value "gold". Though not shown, the policy content contained within the atomic policy 2005 presumably has different effects depending on the value of the level parameter. In addition to setting this parameter value for the referenced policy, the composite policy 2000 sets an alias of "QOS-Gold" for the effective policy created by this reference. In some embodiments, the effective policies as applied are assigned a derived identity which reflect their definition and position within the larger composite policy that caused their application, in order for administrators to track the effects of the policies more easily. In order to avoid ambiguities (especially in cases like this, where the effective policy will always be the policy 2005 referenced by the composite policy 2000), the policy creators may assign aliases to each of the component policies of a composite. The alias gives the effective policy a persistent identity which can outlive changes to the policy content of the atomic policy.

If the parameter app.config.tier has a value of 2 for a particular resource, then the policy 2000 as applied to the resource again refers to the atomic policy 2005, but with a level parameter value of "silver", and sets an alias of "QOS-Silver" for the effective policy created by this reference. Lastly, if the app.config.tier parameter has a value other than 1 or 2 (or no value at all) for a particular resource, then the policy 2000 as applied to the resource still refers to the atomic policy 2005, but with a level parameter value of "bronze", and sets an alias of "QOS-Bronze" for the effective policy created by the reference.

V. Validation of Effective Policies

Once the policy-to-resource bindings are compiled to create a set of effective policies bound to each resource managed by the policy unification framework, some embodiments perform a validation check on the policy bindings to ensure that the policies do not violate any rules set by the administrator. Because the policies may be created by various different users (e.g., at the individual level, business group level, datacenter owner level, etc.) and imported from a multitude of sources, the possibility of conflicts may occur. As a simple example, a first policy might specify that a VM can have a maximum disk space of 8 GB, while a second policy specifies that the same VM must have at least 16 GB of disk space. Clearly, both policies cannot be enforced for the same VM at the same time.

Figure 21:
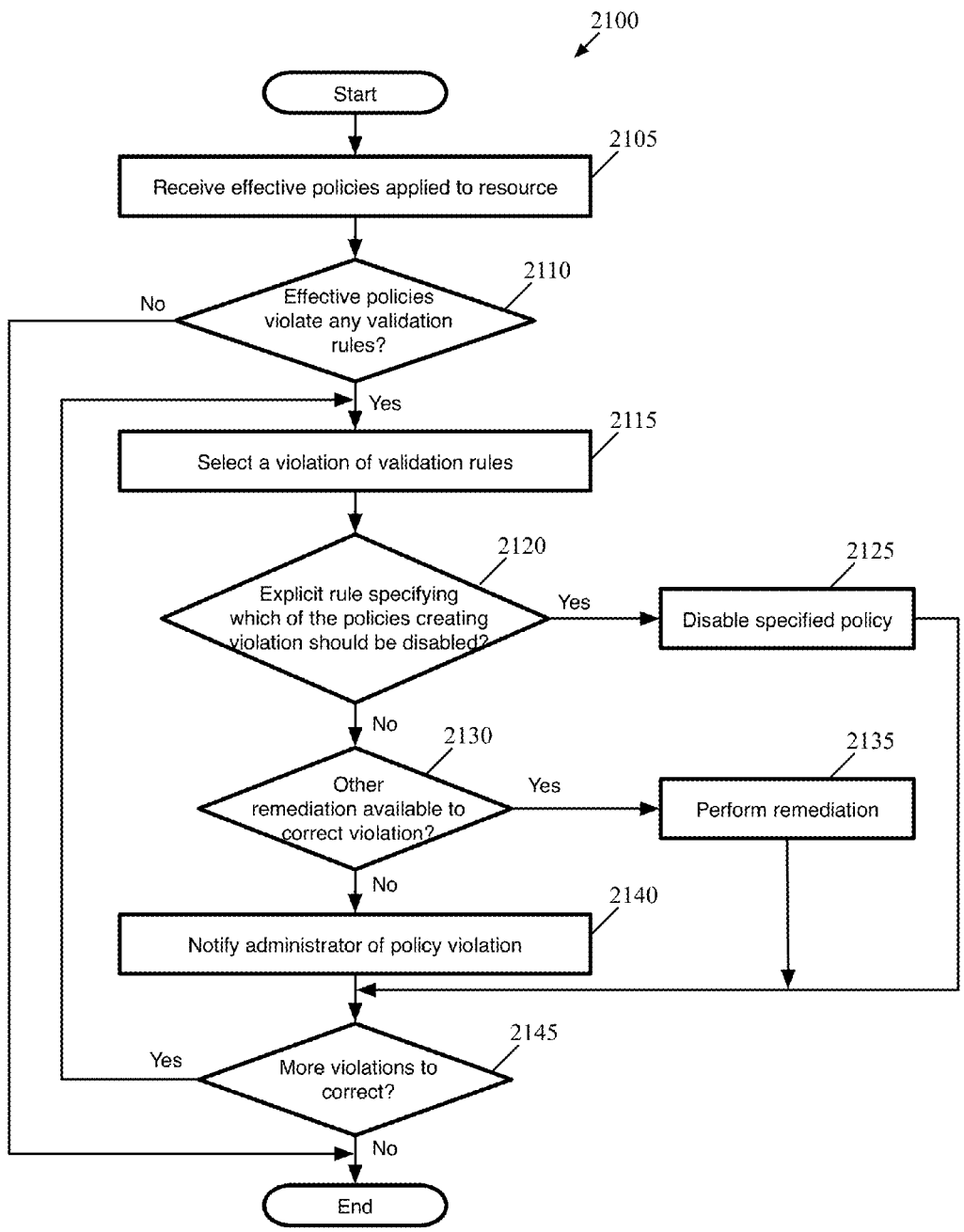
FIG. 21 conceptually illustrates a process performed by the validation engine of some embodiments for determining whether effective policies applied to a particular resource result in any violations of validation rules and correcting such violations.

FIG. 21 conceptually illustrates a process 2100 performed by the validation engine (e.g., the validation engine 320) of some embodiments for determining whether effective policies applied to a particular resource result in any violations of validation rules and correcting such violations. This process 2100 illustrates the validation check being performed for a single resource. However, it should be understood that the validation engines of different embodiments may perform the process for each different resource (serially or in parallel) to which policies are bound. In addition, some embodiments also include validation rules that detect violations when a first policy is applied to a first resource and a second policy is applied to a second resource (e.g., a first policy applied to a VM mandating at least 32 GB of disk space and a second policy applied to the server on which the VM resides mandating that no VM on the server be allocated more than 16 GB of disk space). Thus, some embodiments perform validation on a per-validation-rule basis, with the validation engine searching through the effective policies to identify violations of each rule.

As shown, the process begins by receiving (at 2105) a resource with the effective policies applied to that resource. In some embodiments, as described above, after compilation, the binding rules bind policies to resources resulting in a set of zero or more effective policies for each resource. The effective policies are atomic policies from the policy store with any details completed. That is, the parameter values are filled in, functions are evaluated, etc.

The process then determines (at 2110) whether the effective policies bound to the resource violate any validation rules. Validation rules may be set by the provider of the policy unification framework (e.g., as part of a content package along with sets of binding rules, policies, and/or category derivation rules). The validation rules may also be set by an administrator of the computing environment (e.g., through a user interface provided by the framework). The rules may be recognitions of clearly problematic policy combinations, such as two policies that put incompatible restraints on a resource (e.g., conflicting disk size or memory constraints, conflicting bandwidth constraints, etc.). In addition, validation rules may simply be based on a decision by the administrator to disallow certain policy combinations within the computing environment. For example, an administrator might want to prevent certain firewall rules from being applied to resources that have the highest tier of quality of service applied. Rather than trying to identify all of the policies and binding rules, which may be instituted by different entities (users, groups, etc.), the administrator can simply create a validation rule to identify resources with the problematic combination. If no violations are found for the current resource, then the process ends.

Otherwise, if any violations of the validation rules exist, the process 2100 selects (at 2115) one of the violations to correct. The process determines (at 2120) whether the validation engine has an explicit rule specifying which of the policies that create the violation should be disabled for the resource. In some embodiments, a violation rule may explicitly state that if policy A and policy B are both applied to a resource, to disable policy A and leave policy B in effect (or vice versa). For example, when the administrator of a computing environment creates a validation rule such as the one mentioned above, they may have in mind a specific solution that they prefer (e.g., disabling one of the policies or the other). In other cases, such as when the policies are in direct conflict (e.g., policy A specifies a maximum of X for some value X while policy B specifies a minimum greater than X for that value), the validation rule may not specify which of the policies to disable as that may be context-sensitive.

When such an explicit rule exists, the process disables (at 2125) the specified policy. In some embodiments, disabling an effective policy removes the binding of the effective policy from the resource completely. However, in other embodiments (as described above regarding exceptions to the binding rules), disabling an effective policy only entails negating the binding. In this manner, the effective policy is still bound to the resource, but this binding is not exported to the policy engines. This allows an administrator to view the negated bindings in order to identify the reasons for the negation. The process then proceeds to 2145 to determine whether additional violations require correction for the resource.

When there is no explicit rule governing which of the two or more conflicting policies should be disabled, the process 2100 determines (at 2130) whether any other remediation is available to correct the violation. This remediation could still involve disabling one of the policies based on the precedence of one policy over the other (e.g., a hierarchy of policies). For example, a network administrator for a group might set default policies for resources owned by that group, but also allow for those policies to be overwritten by specific sub-groups. In this case, if a conflict exists, the sub-group policy would take precedence and the validation engine would disable the default policy. On the other hand, the network administrator could set policies that automatically take precedence over sub-group policies. Similarly, the some sources of policy templates could be preferred over others, resulting in precedence based on the policy source. On the other hand, certain violations might be recognized as business rule violations but which do not actually create a conflict for the policy engines, in which case some embodiments will allow the policies to be applied in violation of the rule. In yet other cases, some embodiments identify when a policy can be modified in such a way that will alleviate the conflict (e.g., by changing a parameter value), and perform this modification when allowed. When such a remediation is available for the conflicting policies, the process performs (at 2135) the remediation to correct or accept the conflict.

If there is no clear determiner as to how to resolve the violation, the process 2100 of some embodiments notifies (at 2140) the computing environment administrator of the policy violation. Some embodiments create a list of notifications regarding validation rule violations (and other issues in some such embodiments, such as policies in force but being violated in the computing environment) and present this list to the administrator or other users in the user interface of the policy framework (or at least make the list accessible through the user interface).

Some embodiments, as an alternative, disable all of the policies the combination of which creates the violation when there is no explicit rule as to which policy should be disabled and there is no hierarchical solution. In addition, some embodiments notify the administrator of the violation and any remediation performed anytime there is a violation, irrespective of whether the violation was corrected.

After processing the violation, the process determines (at 2145) whether any additional violations require correction. In some embodiments, this involves rechecking the current policies bound to the resource and in effect to ensure that the disabling of any policies in operations 2125 or 2135 cured the violation. If additional violations of the validation rules require correction, the process returns to 2115 to select the next violation. Otherwise, the process 2100 ends.

Figure 22:
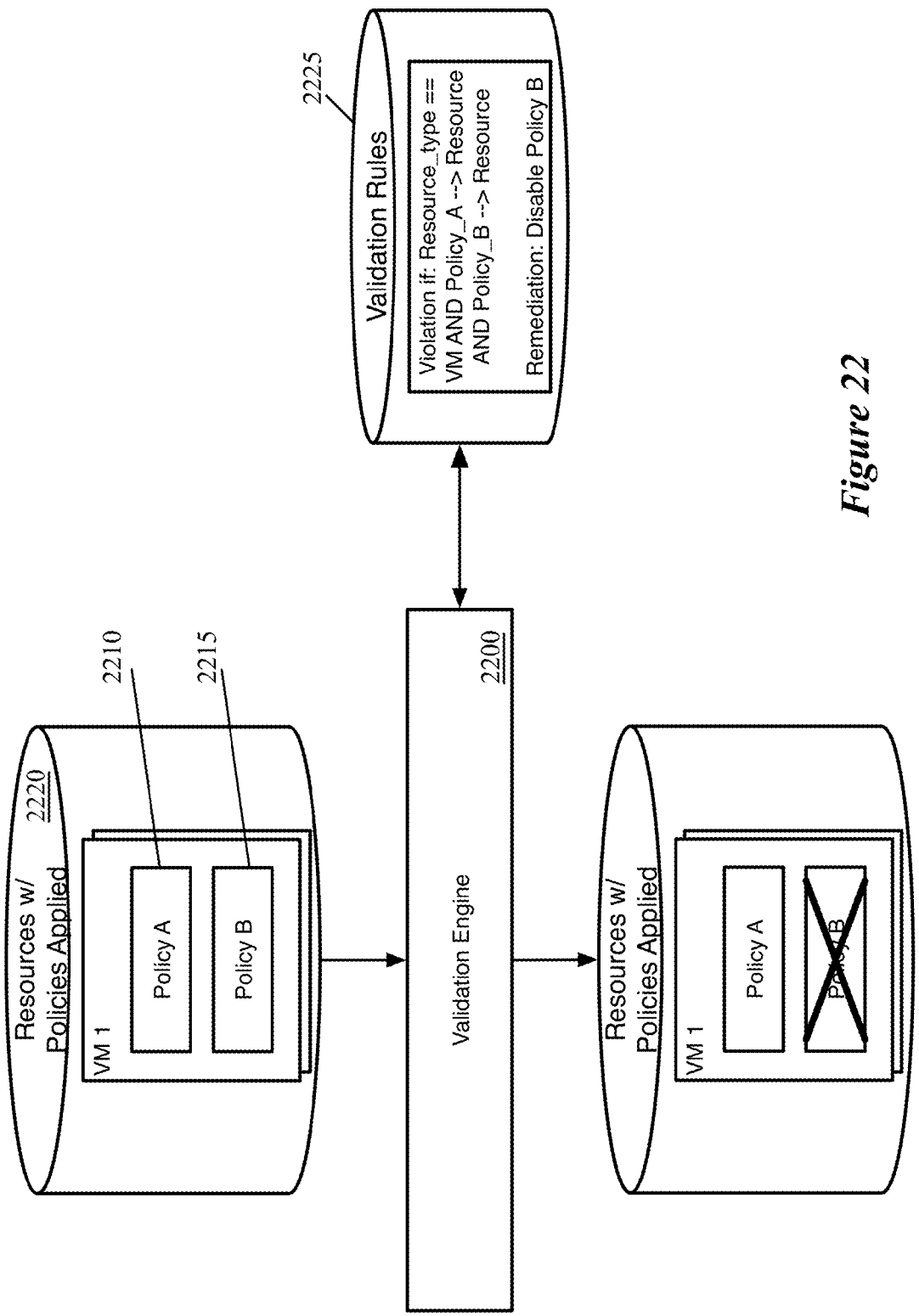
FIG. 22 conceptually illustrates an example of a validation engine applying a validation rule to a set of conflicting effective policies that are bound to a VM.

FIG. 22 conceptually illustrates an example of a validation engine 2200 applying a validation rule 2205 to a set of conflicting effective policies 2210 and 2215 that are bound to a VM. As shown, the validation engine 2200 receives a set of resources 2220, each with a set of zero or more effective policies applied. Specifically, the resources include a VM 1 with two effective policies applied: Policy A 2210 and Policy B 2215.

The validation engine 2200 checks the sets of effective policies for the resources, including VM 1, against a set of validation rules 2225. As shown, these include a rule 2205 that identifies a violation if both Policy A and Policy B are applied to a resource of the type VM. As VM 1 matches this description, the validation engine 2200 identifies this resource to be in violation of the rule. This rule explicitly states that Policy B should be disabled for a resource meeting these conditions, so the validation engine disables Policy B 2215 in this example.

VI. Policy Framework User Interface

As discussed with regard to several features above, the policy unification framework of some embodiments provides a user interface that allows an administrator of the computing environment managed by the policy framework to view and edit the resources, policies, and bindings. In some embodiments, the administrator can use the UI to create and edit composite policies, binding rules, and resource category derivation rules. When creating and editing the composite policies, the user may define how the policies are composed according to the policy composition features allowed by the composition language (e.g., define conditions for referencing policies, provide the parameters for the policy references, etc.).

FIG. 23-28 illustrate features of an example graphical user interface (GUI) of the policy unification framework of some embodiments. It should be understood that the GUI features shown in these figures are merely examples, and that the GUIs with different layouts, appearances, and features are all possible within the scope of the invention. For instance, while the example figures show policies and binding rules being edited in pop-up windows that appear over the background GUI, other embodiments provide these editing features in a different page of the same GUI, rather than as a separate window.

Figure 23:
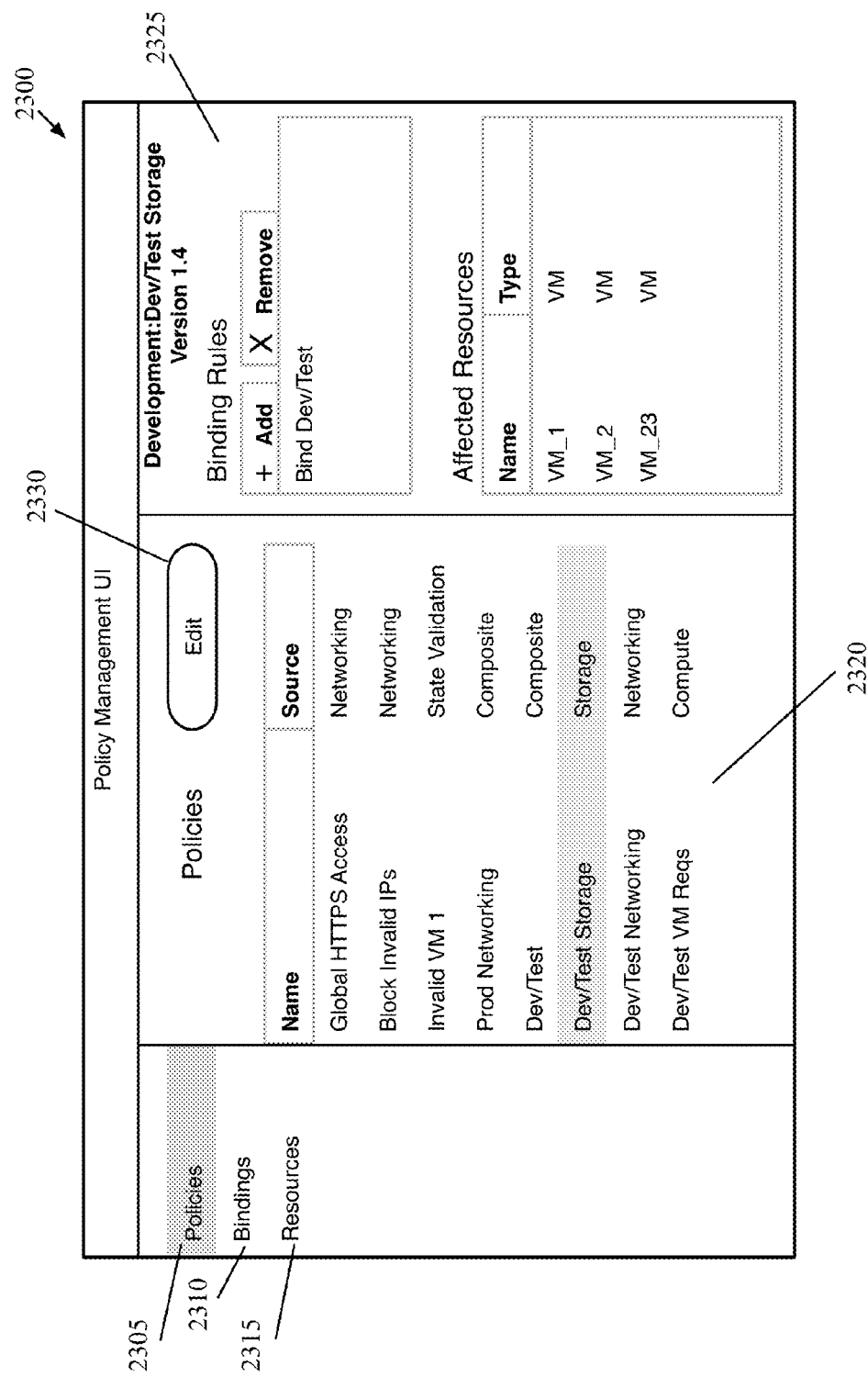
FIG. 23 illustrates a policy framework GUI of some embodiments that is currently highlighting the policies available for binding to resources in the policy unification framework.

FIG. 23 illustrates a policy framework GUI 2300 of some embodiments that is currently highlighting the policies available for binding to resources in the policy unification framework. As shown, the policy framework GUI 2300 includes three tabs 2305-2315 for policies, bindings, and resources. Each of these tabs allows the user to view a list of the respective entities stored by the system, as well as to view and/or edit additional details regarding those entities. Currently, the policies tab 2305 is selected, so that the GUI presents information about the policies stored by the policy framework.

As shown, the GUI 2300 presents a list 2320 of the policies stored in the policy store of the framework when the policies tab 2305 is selected. Though this examples shows eight policies in the list, a typical enterprise datacenter or multi-tenant datacenter might have hundreds or even thousands of policies. In addition, list 2320 provides information about the policies. In some embodiments, the provided information depends on what type of metadata is stored in the policy wrapper fields for the policies (e.g., in addition to the namespace, name, and version fields).

In this example, the list indicates the source of the policy, which may be a management software product (shown here as Networking, Compute, Storage, etc., some embodiments use the product name), a specific database, etc. for atomic policies. For composite policies, some embodiments identify the source as "composite", as those policies are generated within the system. However, other embodiments might differentiate between composite policies provided as part of a content package and composite policies developed by an administrator. In addition, other embodiments may present other information for each policy in the policy list 2320. For example, some embodiments include a description of the policy, or other additional metadata provided within the policy wrapper.

The GUI 2300 with the policies tab 2305 selected also includes a section 2325 for displaying information about a selected policy. At the moment, a policy named "Dev/Test Storage" is selected in the list 2320, so the GUI section 2325 displays information about this policy. This information includes the full namespace, name, and version ("Development:Dev/Test Storage", version 1.4), as well as information about the policy's use in the computing environment. As shown, this information includes the binding rules that bind the policy to categories of resources, as well as the resources to which the policy is bound based on these rules. In this case, the Dev/Test Storage policy is bound to resources via a "Bind Dev/Test" binding rule (i.e., as one of several policies in the composite "Dev/Test" policy specified by the binding rule). The affected resources are three VMs that presumably satisfy the category requirements of this binding rule. Again, the information displayed about the policy could include additional or other information in some embodiments, such as the parameters exposed by the policy (if any), the component policies of a composite, the policy description for atomic policies, etc.

Figure 24:
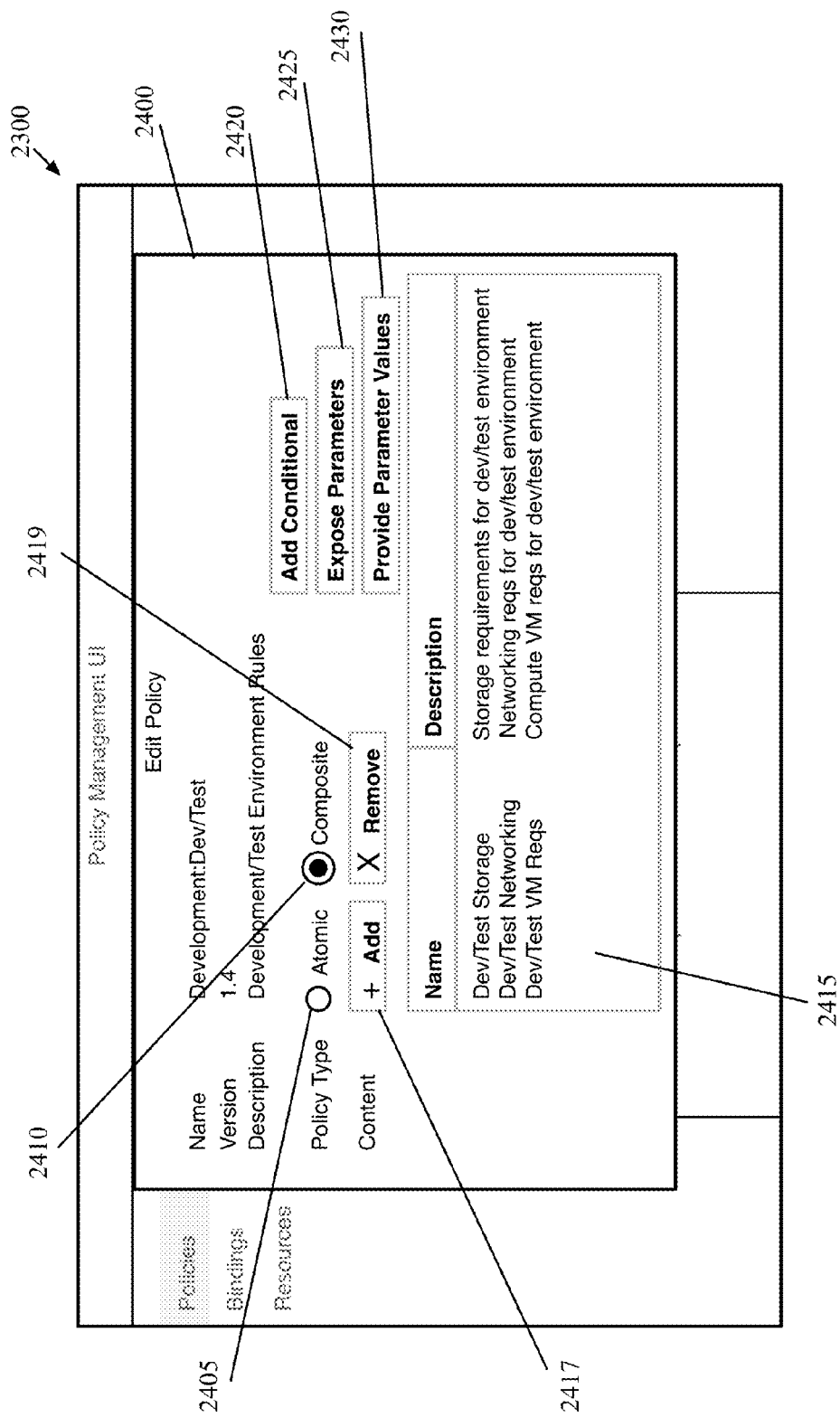
FIG. 24 illustrates a window for editing a selected composite policy.

With the policies tab 2305 selected, the GUI 2300 also includes an Edit button 2330. Selection of this button (or a different GUI construct in other embodiments) allows the user to edit the policy currently selected in the list 2320. FIG. 24 illustrates a window 2400 for editing a selected composite policy that is displayed over the GUI 2300 (e.g., in response to a selection of the Edit button 2330. As shown, the user has selected version 1.4 of the Development:Dev/Test composite policy for editing. The policy editing window 2400 includes basic information about the policy (namespace, name, version, and description, and in other embodiments may include other metadata stores in the policy wrapper for the policy.

In addition, the policy editing window 2400 includes various tools for defining the policy. The window includes selectors 2405 and 2410 that allow the user to view and modify whether the policy is a composite policy or an atomic policy, with different policy content editing interfaces depending on the type of policy. In this case, the selected policy is a composite policy, so the composite policy editing tools are displayed. The content window 2415 for a composite policy displays the component policies of the composite policy, which in this case includes three policies (a storage policy, a networking policy, and a VM requirements policy). In some embodiments, the listed policies are selectable to enable the user to edit the selected policy (e.g., by displaying a new editing window for the selected policy, by expanding the policies within the content window to allow for editing within the window 2400, etc.). The editing window additionally provides selectable items 2417 and 2419 that enable the user to add and remove component policies from the composite policy. Selecting the add policy item 2419, for example, brings up a dialog box in some embodiments that allows the user to search for and select a policy (either an atomic or composite policy) to add to the current composite policy.

The editing window also provides editing tools 2420-2430 that allow the user to add conditional statements to their composite policy, expose parameters for the policy, and provide parameter values to the component policies. For example, selecting the add conditional button 2420 in some embodiments provides an interface for the user to input the conditions required and the policies referenced if those conditions are met. Selecting the expose parameters button 2425 allows the user to provide a name for the parameter or parameters that will be exposed by the composite policy (and therefore required for a policy that references the composite). Similarly, the provide parameter values button 2430 enables a user to provide parameter values for references to one or more of the component policies. These parameter values may be provided in the form of a number or string, a function (e.g., of an exposed parameter value, of a resource-driven value, etc.). As an alternative to these editing tools, or in conjunction with such tools, some embodiments provide a code editor option for window 2415 that allows the user to directly edit the composite policy using the composition language. For instance, some embodiments provide a color-coded editor similar to those commonly used for computer program or mark-up language coding, to enable easy direct editing of the composite policy.

Figure 25:
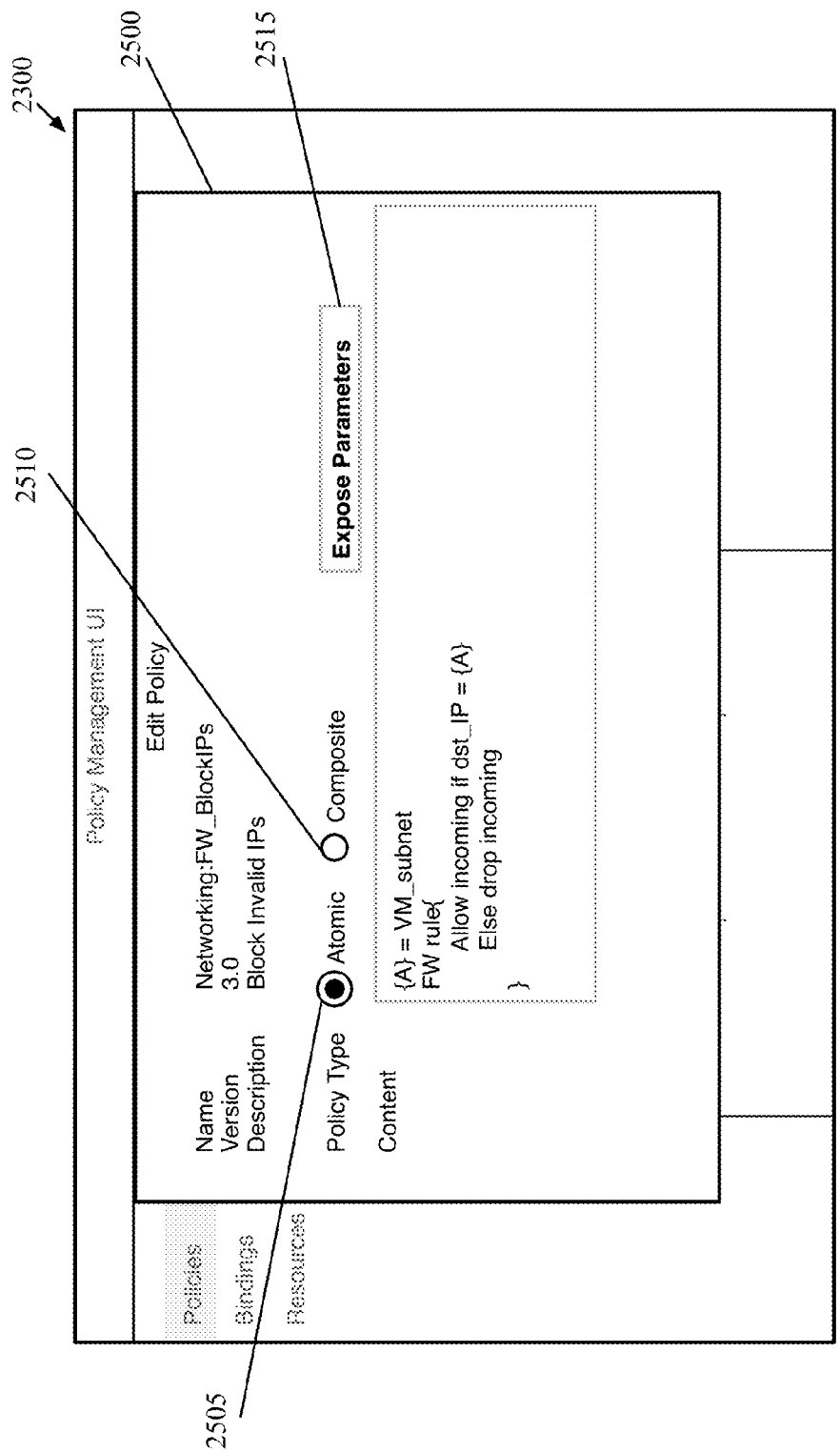
FIG. 25 illustrates an editing window for an atomic policy.

FIG. 25 illustrates an editing window 2500 for an atomic policy in some embodiments, which is also displayed over the GUI 2300. To view this window, the user would have selected the Networking:FW_BlockIPs (version 3.0) policy from a list of policies in the system (e.g., the list 2320 shown in FIG. 23). The basic layout of the editing window 2500 is similar to that of the composite policy editing window 2400, but with differences to account for the currently selected policy being an atomic policy. Again, the window includes two selector 2505 and 2510 that allow the user to identify that the policy is an atomic rather than composite policy. In addition, the content window displays the policy content, as this is an atomic policy and therefore contains a policy content field. In some embodiments, when the policy content is written in a language recognized by the policy framework (e.g., standards based languages or known proprietary domain-specific languages), the editor provides the policy content in an organized manner such as would be shown by a code editor (e.g., with color-coding of tags and end-tags, conditional statements, etc.). The editing tools also include a selectable button 2515 that allows the user to expose parameters for the policy (or to view the parameters that are exposed based on analysis performed at import of the policy). For instance, in the policy shown in this figure, the parameter "VM_subnet" might be exposed by the selected atomic policy.

Figure 26:
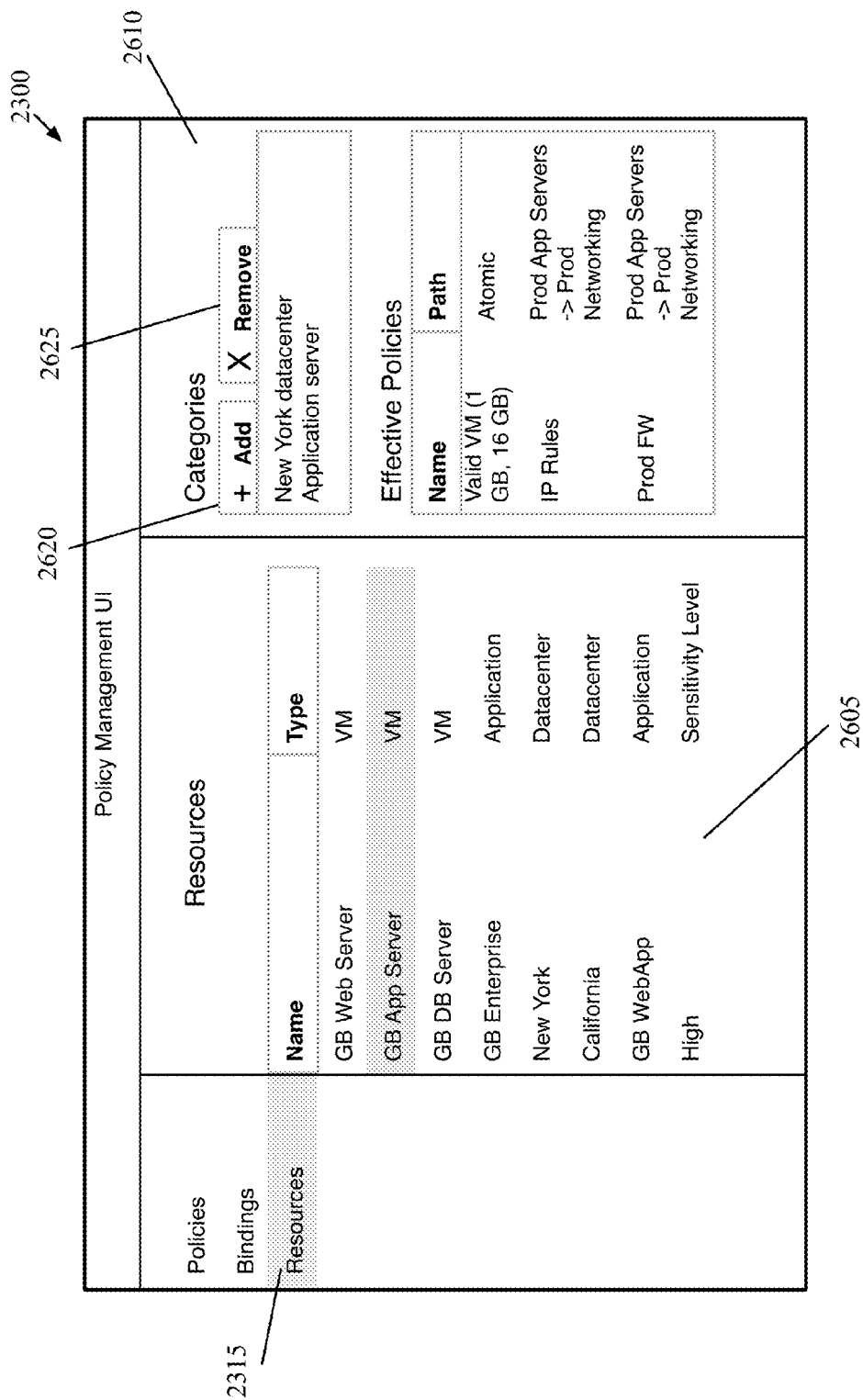
FIG. 26 illustrates the GUI of FIG. 23 with the resources tab selected, so that the GUI presents information about the resources operating in the computing environment managed by the policy framework.

As noted, the policy unification framework GUI 2300 of some embodiments also includes tabs for viewing the binding rules and resource information stored by the system. FIG. 26 illustrates the GUI 2300 with the resources tab 2315 selected, so that the GUI presents information about the resources operating in the computing environment managed by the policy framework.

As shown, the GUI 2300 presents a list 2605 of the resources about which information is stored by the policy framework when the resources tab 2315 is selected. Though this example shows a list of eight resources, a typical enterprise or multi-tenant datacenter might have thousands of resources, or even millions for a larger datacenter. The list 2605 identifies the resources by name (e.g., using a UID provided by the source of the resource information, a name given to the resource by a user, etc.), and also provides additional information about the resource. In this case, the list 2605 identifies the type of each resource. For instance, the list shows three VMs, two applications, two datacenters, and a sensitivity level. Other types of resources include operating system, host machines, forwarding elements (e.g., switches, routers, software virtual switches, etc.), logical forwarding elements and logical networks, etc. In addition to (or as an alternative to) the type of resource, some embodiments display the source of the resource information (or multiple sources, if the resource information is consolidated from multiple sources.

With the resources tab 2315 selected, the GUI 2300 also displays a section 2610 for information about a currently selected resource. In this figure, the resource "GB App Server" is selected in the list 2605, so the GUI section 2610 displays information about this resource. For resources, this information in some embodiments includes the categories to which the resource belongs (other than the resource type, shown in the list 2605) as well as the effective policies applied to the resource by the compiler of the policy unification framework. The current resource belongs to the categories "New York datacenter" and "application server". In addition, GUI provides two selectable items 2620 and 2625 that allow the user to add new category tags for the resource or remove the resource from a category. To remove a category tag, the user in some embodiments selects the category tag and then selects the remove category item 2625. When the user selects the add category item 2620, some embodiments display a GUI construct through which the user can select a category tag or create a new category tag to apply to the resource.

The GUI section 2610 also includes information about the effective policies applied to the selected resource. In this case, three policies are currently bound to the resource "GB App Server" based on its category tags and the binding rules. For each of these effective policies, the GUI also displays the path that was used to arrive at the binding. This path is the path of references from a policy specified in a binding rule to the atomic policy actually bound to the resource. The first effective policy (Valid VM (1 GB, 16 GB)) is an atomic policy that is directly bound to the selected resource. On the other hand, the latter two policies (IP Rules, Prod FW) are both atomic policies bound the selected resource based on the same derivation path. A binding rule specified to bind the composite policy Prod App Servers, which includes a composite policy Prod Networking, which in turn includes the two atomic policies bound as effective policies to the selected application server resource.

Figure 27:
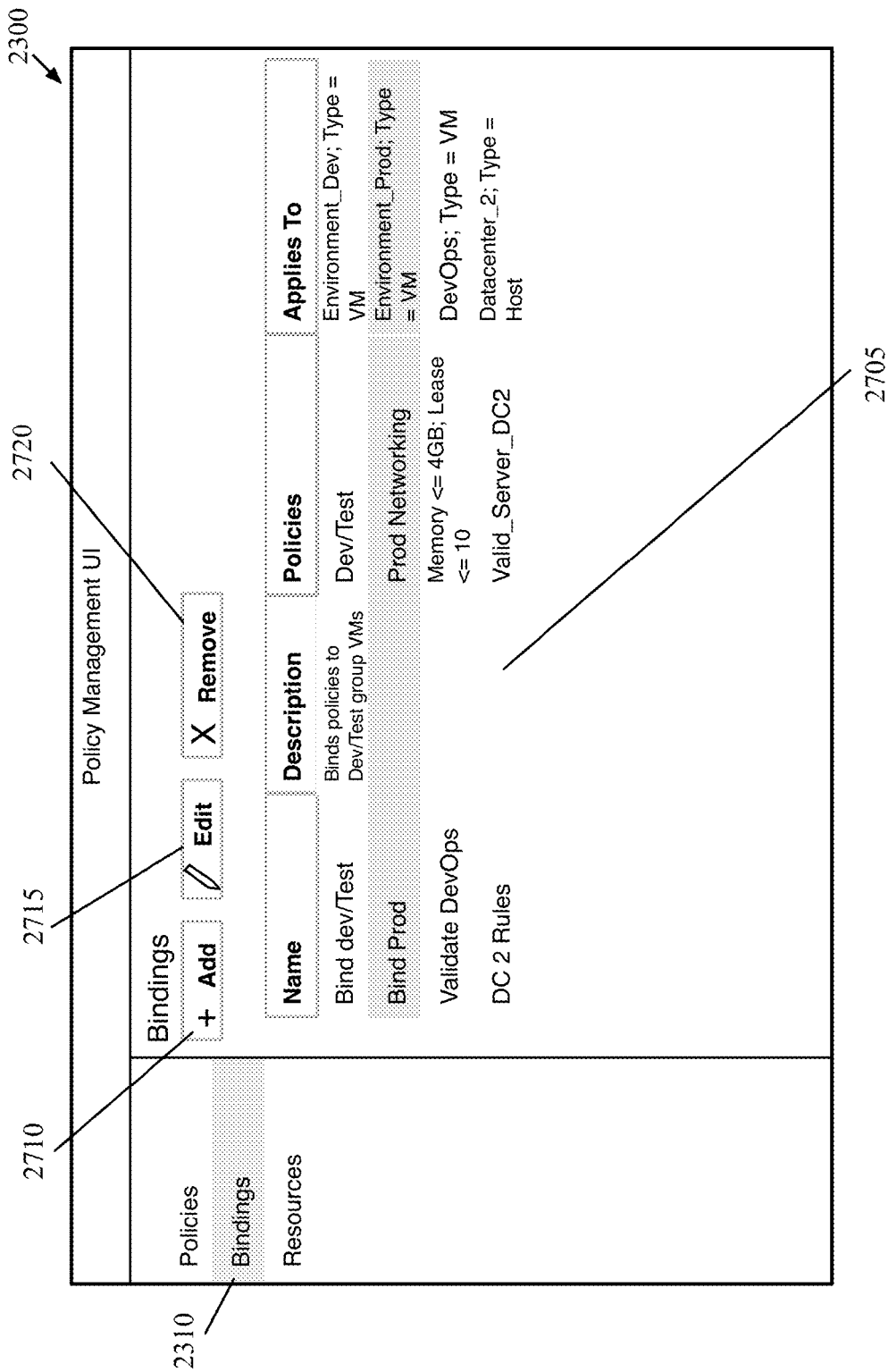
FIG. 27 illustrates the GUI of FIG. 23 with the bindings tab selected, so that the GUI presents information about the various policy-to-resource bindings defined for the policy unification framework.

FIG. 27 illustrates the GUI 2300 with the bindings tab 2310 selected, so that the GUI presents information about the various policy-to-resource bindings defined for the policy unification framework. As shown, the GUI 2300 presents a list 2705 of binding rules that includes various information about the bindings. Specifically, in the example, this list 2705 provides, for each binding, a name and description (when such a description exists in the system). In addition, for each binding rule, the GUI displays the policies that are bound by the rule and the resources or resource categories to which those policies are bound. For example, the binding rule "Validate DevOps" binds the policies "Memory<=4 GB" and "Lease<=10" to VMs that are in the DevOps category.

The GUI 2300 also includes three selectable GUI items 2710-2720 for adding, editing, and removing binding rules. The user can remove binding rules in some embodiments by selecting a rule in the displayed list and selecting the GUI item 2720 (or performing a similar interaction through different GUI constructs in different embodiments). In addition, selecting either of the items 2710 or 2715 causes a pop-up window to be displayed in some embodiments that lets the user either edit an existing binding rule or create a new binding rule (depending on which of the GUI items was selected).

Figure 28:
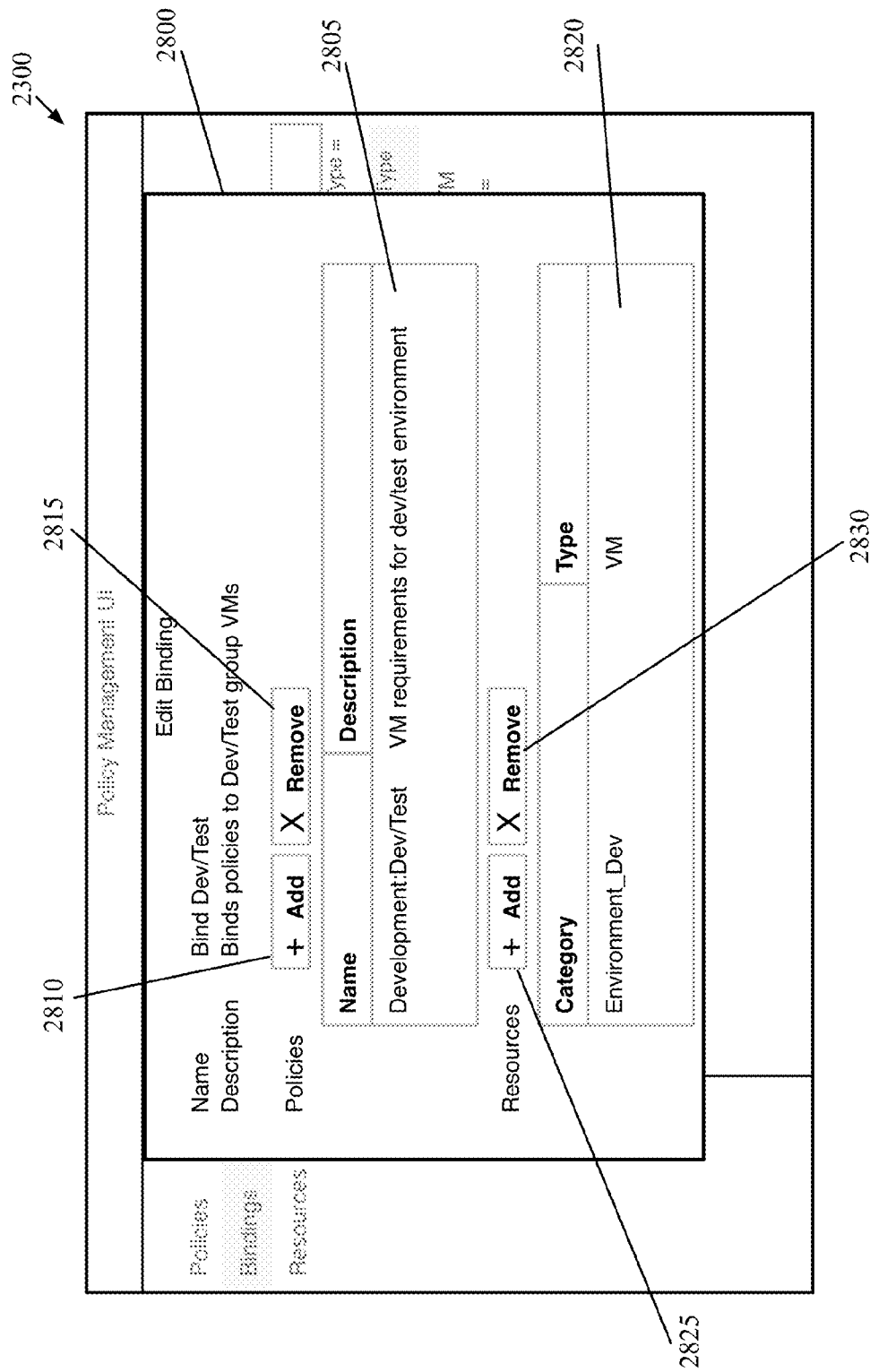
FIG. 28 illustrates such a window for editing a selected binding rule.

FIG. 28 illustrates such a window 2800 for editing a selected binding rule that is displayed over the GUI 2300 (e.g., in response to a selection of the GUI item 2715). As shown, the user has selected the binding rule "Bind Dev/Test", which binds policies to VMs in the Dev/Test group. The binding rule editing window 2800 includes basic information about the binding rule, such as its name and description (and potentially other data stored by the policy framework for binding rules).

In addition, the binding rule editing window 2800 includes various tools for (i) defining the policies that are bound to resources via the binding rule and (ii) defining the categories of resources to which the selected policies are bound. As shown, the editing window includes a first section 2805 that lists the policies bound via the rule and through which policies can be added or removed by selecting the GUI items 2810 and 2815. In some embodiments, selecting the add policy item 2810 presents the user with a searchable list of policies to apply. Some embodiments organize the policies based on source or other factors. The editing window also includes a second section 2820 that lists the categories of resources (or individual resources) to which the rule binds policies, and through which categories can be added or removed by selecting the GUI items 2825 and 2830. In some embodiments, selecting the add category item 2825 presents the user with a searchable list of categories to use, which may be sorted based on source, applicable resource type, etc.

In addition to the features shown in these figures, it should be understood that various other actions may be taken by a user through the policy framework GUI. For example, some embodiments provide an interface for viewing and editing category derivation rules. The category derivation rules interface, in some embodiments, is similar to that shown for binding rules, with the user able to edit which categories combine to form new categories, and which categories from different sources can be viewed as equivalents (and define a new category to consolidate these equivalent categories).

As another example, some embodiments provide an interface for viewing and editing policy validation rules. The policy validation rules interface, in some embodiments, is similar to that shown for binding rules, with the user able to edit which policies cause a conflict as well as what actions to take in order to resolve such policy conflicts. Similarly, the GUI of some embodiments includes an interface for defining exceptions to the binding rules. In some embodiments, this interface is accessible through the binding rule editing window (or a similar construct), and allows the user to view the resources to which a policy would be applied based on the binding rule. The user can then select any of the resources to be excepted from one or more atomic policies. Some embodiments mandate that the user provide an explanation for the exception that can be saved and viewed at a later date.

Some embodiments also provide an interface through which the user can view notifications of violations of validation rules, and disable policies if need be. Some embodiments provide a list of all violations, even when the violation was corrected by automatically disabling one or more of the applied policies. This allows the administrator to determine whether any of the issues causing the violation need correction (e.g., removing a policy or resource category from a binding rule, creating an exception, etc.). In addition, when the policy framework has not automatically corrected the violation, some embodiments require the user to select one or more policies to disable from a resource. A similar interface in some embodiments allows the administrator to view the actual application of the policies in the results store.

VII. Electronic System

Many of the above-described features and applications are implemented as software processes that are specified as a set of instructions recorded on a computer readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 29:
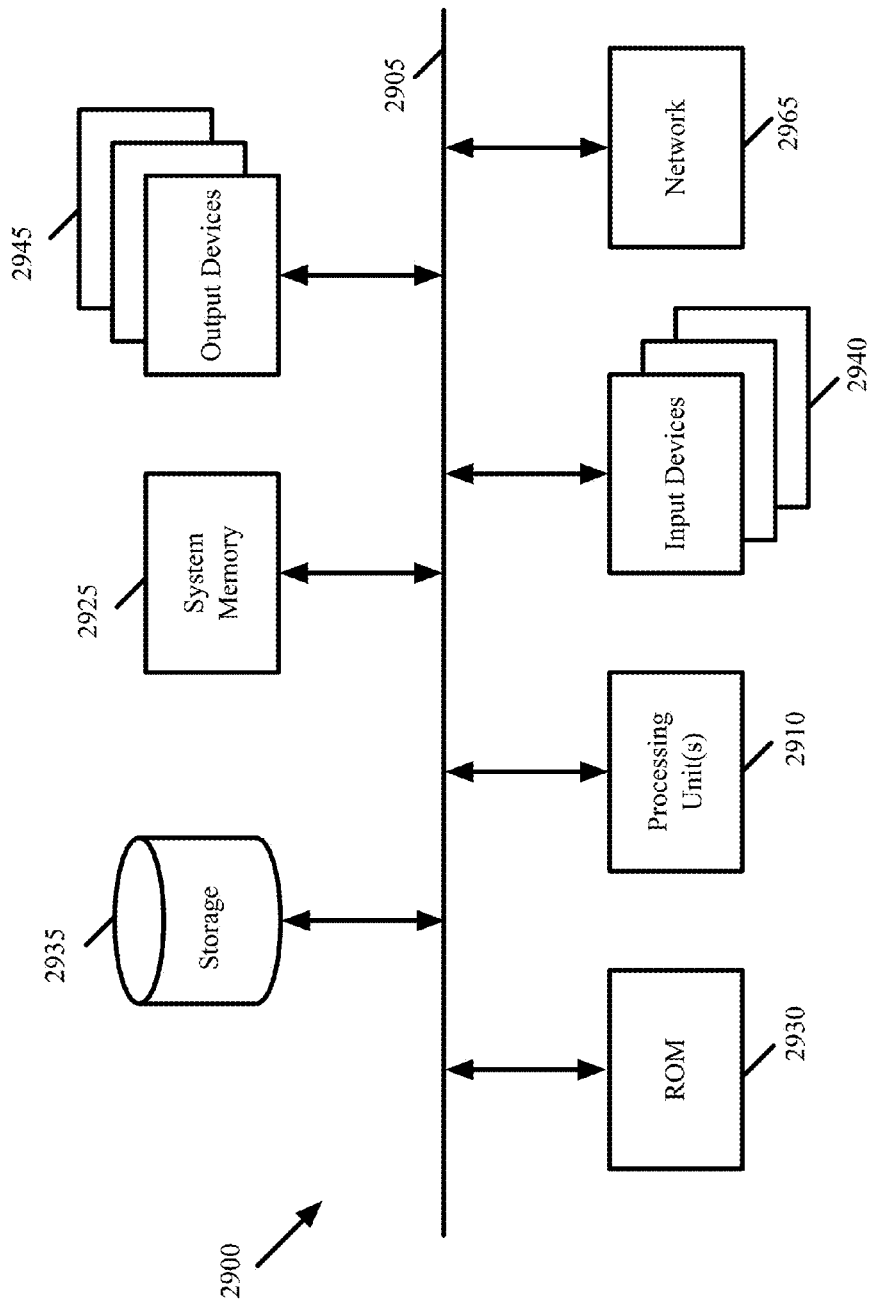
FIG. 29 conceptually illustrates an electronic system with which some embodiments of the invention are implemented.

FIG. 29 conceptually illustrates an electronic system 2900 with which some embodiments of the invention are implemented. The electronic system 2900 can be used to execute any of the control, virtualization, or operating system applications described above. The electronic system 2900 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 2900 includes a bus 2905, processing unit(s) 2910, a system memory 2925, a read-only memory 2930, a permanent storage device 2935, input devices 2940, and output devices 2945.

The bus 2905 collectively represents all system, peripheral, and chipset buses that communicatively connect the numerous internal devices of the electronic system 2900. For instance, the bus 2905 communicatively connects the processing unit(s) 2910 with the read-only memory 2930, the system memory 2925, and the permanent storage device 2935.

From these various memory units, the processing unit(s) 2910 retrieve instructions to execute and data to process in order to execute the processes of the invention. The processing unit(s) may be a single processor or a multi-core processor in different embodiments.

The read-only-memory (ROM) 2930 stores static data and instructions that are needed by the processing unit(s) 2910 and other modules of the electronic system. The permanent storage device 2935, on the other hand, is a read-and-write memory device. This device is a non-volatile memory unit that stores instructions and data even when the electronic system 2900 is off. Some embodiments of the invention use a mass-storage device (such as a magnetic or optical disk and its corresponding disk drive) as the permanent storage device 2935.

Other embodiments use a removable storage device (such as a floppy disk, flash drive, etc.) as the permanent storage device. Like the permanent storage device 2935, the system memory 2925 is a read-and-write memory device. However, unlike storage device 2935, the system memory is a volatile read-and-write memory, such a random access memory. The system memory stores some of the instructions and data that the processor needs at runtime. In some embodiments, the invention's processes are stored in the system memory 2925, the permanent storage device 2935, and/or the read-only memory 2930. From these various memory units, the processing unit(s) 2910 retrieve instructions to execute and data to process in order to execute the processes of some embodiments.

The bus 2905 also connects to the input and output devices 2940 and 2945. The input devices enable the user to communicate information and select commands to the electronic system. The input devices 2940 include alphanumeric keyboards and pointing devices (also called "cursor control devices"). The output devices 2945 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 29, bus 2905 also couples electronic system 2900 to a network 2965 through a network adapter (not shown). In this manner, the computer can be a part of a network of computers (such as a local area network ("LAN"), a wide area network ("WAN"), or an Intranet, or a network of networks, such as the Internet. Any or all components of electronic system 2900 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DNCs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system isolates the containers for different tenants and therefore provides operating-system level segregation of the different groups of applications that operate within different containers. This segregation is akin to the VM segregation that is offered in hypervisor-virtualized environments, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESX hypervisor of VMware Inc.

One of ordinary skill in the art will recognize that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures (including FIGS. 4, 9, 14, and 21) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method for managing policies for a set of computing resources, the method comprising:
   importing a plurality of sets of resource management policy rules from a plurality of heterogeneous sources of a virtual machine computing environment;
   storing an imported policy rule as a primitive policy;
   extracting policy information from the primitive policy;
   storing a wrapper with the primitive policy, the wrapper identifying a policy rule identified in the policy information, the wrapper utilizing a first language different than a second language utilized by the primitive policy;
   associating the primitive policy with a resource in the set of computing resources;
   generating a first composite policy for the resource, wherein the composite policy includes a first reference identifying the primitive policy;
   generating a second composite policy for the resource, wherein the second composite policy includes a second reference to the first composite policy; and
   transmitting a plurality of policies referenced within the second composite policy, including the primitive policy and the wrapper, to a policy engine of the virtual machine computing environment, the policy engine to apply the primitive policy by reading the wrapper using the first language without reading the primitive policy using the second language.

2. The method of claim 1, wherein different sets of policy rules are defined in a plurality of different languages.

3. The method of claim 2, wherein a first primitive policy is defined in an XML schema.

4. The method of claim 1, wherein the first composite policy includes a first primitive policy defined in the second language and a second primitive policy defined in a third, different language.

5. The method of claim 1, wherein the first composite policy includes a first primitive policy imported from a first source and a second primitive policy imported from a second source.

6. The method of claim 1, wherein the second composite policy includes the first composite policy and a another primitive policy imported from a third source.

7. The method of claim 1, wherein the first composite policy comprises includes an inline definition of a second primitive policy.

8. The method of claim 1, wherein the first composite policy includes a reference to another primitive policy.

9. The method of claim 1 further including applying the imported policies to the set of resources according to a set of binding rules, wherein the applied policies are used by a plurality of policy engines to manage the set of computing resources.

10. The method of claim 9, wherein at least a particular one of the heterogeneous sources of the policy rules is also one of the policy engines that uses the applied policies.

11. The method of claim 10, wherein the particular heterogeneous source is also a source of information about at least one computing resource in the set of computing resources.

12. A non-transitory machine readable medium storing a program which when executed by at least one processing unit manages policies for a set of computing resources, the program comprising sets of instructions for at least:
   importing a plurality of sets of resource management policy rules from a plurality of heterogeneous sources of a virtual machine computing environment;
   storing an imported policy rule as a primitive policy;
   extracting policy information from the primitive policy;
   storing a wrapper with the primitive policy, the wrapper identifying a policy rule identified in the policy information, the wrapper utilizing a first language different than a second language utilized by the primitive policy;
   associating the primitive policy with a resource, in the set of computing resources;
   generating a first composite policy for the resource, wherein the composite policy includes a first reference identifying the primitive policy;

generating a second composite policy for the resource, wherein the second composite policy includes a second reference to the first composite policy; and transmitting a plurality of policies referenced within the second composite policy, including the primitive policy and the wrapper, to a policy engine of the virtual machine computing environment, the policy engine to apply the primitive policy by reading the wrapper using the first language without reading the primitive policy using the second language.

13. The machine readable medium of claim 12, wherein different sets of policy rules are defined in a plurality of different languages.

14. The machine readable medium of claim 12, wherein the first composite policy includes a first primitive policy defined in the second language and a second primitive policy defined in a third, different language.

15. The machine readable medium of claim 12, wherein the first composite policy includes a first primitive policy imported from a first source and a second primitive policy imported from a second source.

16. The machine readable medium of claim 12, wherein the first composite policy includes an inline definition of a second primitive policy.

17. The machine readable medium of claim 12, wherein the program further includes a set of instructions for applying the imported policies to the set of resources according to a set of binding rules, wherein the applied policies are used by a plurality of policy engines to manage the set of computing resources.

18. The machine readable medium of claim 17, wherein at least a particular one of the heterogeneous sources of the policy rules is also one of the policy engines that uses the applied policies, wherein the particular heterogeneous source is also a source of information about at least one computing resource in the set of computing resources.

* * * * *

UNITED STATES PATENT AND TRADEMARK OFFICE
CERTIFICATE OF CORRECTION

PATENT NO. : 10,075,343 B2
APPLICATION NO. : 14/828443
DATED : September 11, 2018
INVENTOR(S) : Burk et al.

Page 1 of 1

It is certified that error appears in the above-identified patent and that said Letters Patent is hereby corrected as shown below:

In the Claims

Column 40, Line 33 Claim 7:
Delete "comprises" after policy.

Signed and Sealed this
Twelfth Day of November, 2019

Andrei Iancu
*Director of the United States Patent and Trademark Office*